United States Patent
Chen et al.

(10) Patent No.: US 12,388,504 B2
(45) Date of Patent: Aug. 12, 2025

(54) ELECTROMAGNETIC UNIT REGULATION METHOD AND APPARATUS, AND DEVICE AND STORAGE MEDIUM

(71) Applicant: ZTE CORPORATION, Shenzhen (CN)

(72) Inventors: Yijian Chen, Shenzhen (CN); Min Fang, Shenzhen (CN); Jianwu Dou, Shenzhen (CN); Lin Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 508 days.

(21) Appl. No.: 17/791,442

(22) PCT Filed: Dec. 29, 2020

(86) PCT No.: PCT/CN2020/140874
§ 371 (c)(1),
(2) Date: Jul. 7, 2022

(87) PCT Pub. No.: WO2021/139570
PCT Pub. Date: Jul. 15, 2021

(65) Prior Publication Data
US 2023/0041198 A1 Feb. 9, 2023

(30) Foreign Application Priority Data
Jan. 7, 2020 (CN) .......................... 202010015133.1

(51) Int. Cl.
*H04B 5/72* (2024.01)
*H04B 7/0456* (2017.01)
*H04B 7/06* (2006.01)

(52) U.S. Cl.
CPC ............. *H04B 5/72* (2024.01); *H04B 7/0469* (2013.01); *H04B 7/0617* (2013.01)

(58) Field of Classification Search
CPC ...... H04B 5/72; H04B 7/0469; H04B 7/0617; H04B 7/04013; H04B 7/0691;
(Continued)

(56) References Cited

U.S. PATENT DOCUMENTS 11,041,936 B1 * 6/2021 Wall ..................... H01Q 1/425
2006/0109540 A1 5/2006 Kueks et al.
(Continued)

FOREIGN PATENT DOCUMENTS

| CN | 1267089 A | 9/2000 |
| CN | 1348103 A | 5/2002 |

(Continued)

OTHER PUBLICATIONS

Hu J, Zhang H, Di B, Li L, Song L, Li Y, Han Z, Poor HV. Reconfigurable Intelligent Surfaces based RF Sensing: Design, Optimization, and Implementation. arXiv preprint arXiv:1912. 09198. Dec. 19, 2019. (Year: 2019).*

(Continued)

*Primary Examiner* — Fayyaz Alam
(74) *Attorney, Agent, or Firm* — Morgan, Lewis & Bockius LLP

(57) ABSTRACT

An electromagnetic unit regulation method and apparatus, and a device and a storage medium are provided. The electromagnetic unit regulation method includes: determining a to-be-regulated electromagnetic unit set S2, where the to-be-regulated electromagnetic unit set S2 is a subset of a regulatable electromagnetic unit set S1; grouping an electromagnetic unit set into X electromagnetic unit groups, where X≥1, and the electromagnetic unit set includes at least one of the to-be-regulated electromagnetic unit set S2 and the regulatable electromagnetic unit set S1; determining an electromagnetic property set to be regulated; and according to the X electromagnetic unit groups, performing regulation (Continued)

on an electromagnetic property of the to-be-regulated electromagnetic unit set S2, where the electromagnetic property is at least one electromagnetic property in the electromagnetic property set.

20 Claims, 18 Drawing Sheets

(58) Field of Classification Search
CPC .... H04B 7/0874; H04B 7/145; H04B 7/0456; H04B 5/70; H01Q 15/0013; H01Q 15/148; H04L 1/0003; H04W 72/21; H04W 72/23
See application file for complete search history.

(56) References Cited

U.S. PATENT DOCUMENTS

| | | | |
|---|---|---|---|
| 2014/0043124 | A1 | 2/2014 | Liu et al. |
| 2015/0207549 | A1* | 7/2015 | Nagata .............. H04W 72/0453 370/252 |
| 2015/0288063 | A1* | 10/2015 | Johnson ................ H01Q 3/24 342/368 |
| 2019/0044246 | A1* | 2/2019 | Pitsillides .......... H01Q 15/0086 |
| 2022/0286189 | A1* | 9/2022 | Svendsen ............. H04B 7/0617 |

FOREIGN PATENT DOCUMENTS

| | | |
|---|---|---|
| CN | 104078771 A | 10/2014 |
| CN | 106654592 A | 5/2017 |
| CN | 108511916 A | 9/2018 |
| CN | 110225538 A | 9/2019 |
| CN | 110504550 A | 11/2019 |
| CN | 111130574 A | 5/2020 |
| CN | 111901014 A | 11/2020 |
| EP | 3179651 A1 | 6/2017 |
| EP | 3439107 A1 | 2/2019 |
| JP | 2006279669 A | 10/2006 |
| JP | 2013539949 A | 10/2013 |
| JP | 2019530387 A | 10/2019 |
| KR | 20190098602 A | 8/2019 |

OTHER PUBLICATIONS

Indian First Office Action for Application No. 2022270455.5, dated Oct. 18, 2022, 4 pages including translation.
Japanese Office Action for Application No. 2022542056, dated Jul. 26, 2023, 8 pages including translation.
Chinese First Office Action for Application No. 202010015133.1, date unknown, 10 pages including translation.
Chinese Second Office Action for Application No. 202010015133.1, date unknown, 8 pages including translation.
English translation of Chinese Search Report for Application No. 2020100151331, date unknown, 2 page.
English translation of Chinese Supplementary Search Report for Application No. 2020100151331, date unknown, 1 page.
International Search Report for Application No. PCT/CN2020/140874, dated Mar. 18, 2021, 5 pages including English translation.
Extended European Search Report for Application No. 20912113.6, dated Jan. 23, 2024, 9 pages including translation.
Y. Yang, et al., "Intelligent Reflecting Surfaces Meets OFDM: Protocol Design and Rate Maximization," in IEEE Transactions on Communications, vol. 68, No. 7, pp. 4522-4535, Jul. 2020, doi: 10.1109/TCOMM.2020.2981458.
J. Hu et al., "Reconfigurable Intelligent Surface Based RF Sensing: Design, Optimization, and Implementation," in IEEE Journal on Selected Areas in Communications, vol. 38, No. 11, pp. 2700-2716, Nov. 2020, doi: 10.1109/JSAC.2020.3007041.
First Office Action in Japanese Application No. 2024-025580, dated Feb. 6, 2025, 8 pages, including translation.
Wu et al., "Towards Smart and Reconfigurable Environment" Intelligent Reflecting Surface Aided Wireless Network, IEEE communications magazine 58.1 (2019): 106-112.

* cited by examiner

ELECTROMAGNETIC UNIT REGULATION METHOD AND APPARATUS, AND DEVICE AND STORAGE MEDIUM

CROSS-REFERENCE TO RELATED APPLICATION(S)

This is a national stage application filed under 37 U.S.C. 371 based on International Patent Application No. PCT/CN2020/140874, filed Dec. 29, 2020, which claims priority to Chinese Patent Application No. 202010015133.1 filed Jan. 7, 2020, the disclosures of both of which are incorporated herein by reference in their entireties.

TECHNICAL FIELD

The present disclosure relates to the field of an intelligent surfaces, for example, to an electromagnetic unit regulation method, an electromagnetic unit regulation apparatus, a device and a storage medium.

BACKGROUND

An intelligent surface (IS), also known as a smart surface, a configurable electromagnetic surface and etc., may become very active in future communication, and can realize wireless communication, wireless charging and remote sensing, which may enable a physical environment to become "intelligent" and interactive.

FIG. 1 is a schematic structural diagram of an intelligent surface in the related art. As shown in FIG. 1, each regulatable electromagnetic unit is required to correspond to a group of electronic control devices. FIG. 2 is a schematic diagram showing an implementation of phase property regulation in the related art. As shown in FIG. 2, a control chip is connected to each electromagnetic unit via a bus. Assuming that there are N regulatable electromagnetic units, each electromagnetic unit is required to be provided with an internal electronic control device, and the internal electronic control device is connected to the control chip via the bus, and the control chip regulates the phase for each electromagnetic unit according to requirements of practical applications.

In a case where a number of elements of an intelligent surface or a number of regulatable electromagnetic units is very large, there will be several major technical problems. Firstly, in practical scenarios, in order to obtain better effects, a number of electromagnetic units that are to be regulated has to be very large, for example, from the $3^{rd}$ power of 10 to the $5^{th}$ power of 10, the calculation of a N-dimensional regulation matrix corresponding to electromagnetic properties will have a very huge calculation amount with a high complexity, which is not conducive to the application of the intelligent surface. Secondly, for different users, different transmitting or reflecting strategies, different channels or signals, requirements of performance and electromagnetic coverage are different, however the regulation strategy cannot be changed in view of these differences to perform regulation flexibly according to requirements so as to match different requirements, which leads to a low regulation efficiency. Thirdly, different electromagnetic units have different contributions to the overall performance, however in the related art, some electromagnetic units are assigned with a very low weight of contribution to performance, without being regulated with a higher precision, resulting in unnecessary waste of computation and unnecessary waste of control signaling overhead.

SUMMARY

An electromagnetic unit regulation method, an electromagnetic unit regulation apparatus, a device and a storage medium are provided according to the present disclosure, which reduces regulation dimensions and regulation complexity.

An electromagnetic unit regulation method is provided according to embodiments of the present disclosure, the method includes:

determining a to-be-regulated electromagnetic unit set S2, where the to-be-regulated electromagnetic unit set S2 is a subset of a regulatable electromagnetic unit set S1; grouping an electromagnetic unit set into X electromagnetic unit groups, where X≥1, and the electromagnetic unit set includes at least one of the to-be-regulated electromagnetic unit set S2 and the regulatable electromagnetic unit set S1; determining an electromagnetic property set to be regulated; and according to the X electromagnetic unit groups, performing regulation on an electromagnetic property of the to-be-regulated electromagnetic unit set S2, where the electromagnetic property is at least one electromagnetic property in the electromagnetic property set.

An electromagnetic unit regulation apparatus is further provided according to the embodiments of the present disclosure, the apparatus includes: a first determination module, a grouping module, a second determination module and a regulation module.

The first determination module is configured to determine a to-be-regulated electromagnetic unit set S2, where the to-be-regulated electromagnetic unit set S2 is a subset of a regulatable electromagnetic unit set S1. The grouping module is configured to group an electromagnetic unit set into X electromagnetic unit groups, where X≥1, and the electromagnetic unit set includes at least one of the to-be-regulated electromagnetic unit set S2 and the regulatable electromagnetic unit set S1. The second determination module is configured to determine an electromagnetic property set to be regulated. The regulation module is configured to perform, according to the X electromagnetic unit groups, regulation on an electromagnetic property of the to-be-regulated electromagnetic unit set S2, where the electromagnetic property is at least one electromagnetic property in the electromagnetic property set.

A device is further provided according to an embodiment of the present disclosure, which includes: a memory, and one or more processors; where the memory is configured to store one or more programs; and the one or more programs, when being executed by the one or more processors, cause the one or more processors to implement the electromagnetic unit regulation method described above.

A non-transitory computer readable storage medium is further provided according to the embodiments of the present disclosure, where a computer program is stored in the storage medium, and the computer program, when being executed by a processor, implements the electromagnetic unit regulation method described above.

BRIEF DESCRIPTION OF DRAWINGS

FIG. 26 (2) is a schematic diagram showing another grouping of electromagnetic units in a distributed manner according to an embodiment of the present disclosure;

FIG. 28 (2) is schematic diagram showing another grouping of all electromagnetic units in a to-be-regulated electromagnetic unit set according to another embodiment of the present disclosure;

DETAILED DESCRIPTION

The embodiments of the present disclosure are described hereinafter with reference to the drawings.

In one aspect, an intelligent surface, can intelligently control channel environment, to provide a larger transmission capacity, a higher efficiency of wireless charging, and a stronger robustness. In another aspect, the intelligent surface can support access by a large number of terminals, which makes it possible to realize the grandest vision of the internet of things (IoT). The intelligent surface according to the present disclosure can actually be extended to a wireless environment with a physical surface on which electromagnetic is active. Every part in the wireless environment, can transmit and receive electromagnetic fields, and if these electromagnetic fields can be intelligently controlled, it is possible to collect energy in a three-dimensional space for transmission and reception, increasing capability efficiency and reducing interference. Therefore, these surfaces will bring a brand-new communication, sensing and control capabilities in electromagnetic environment. The intelligent surface can be used in many aspects, which includes that the intelligent surface can be used for solving problems in high-frequency and non-line-of-sight communications, solving coverage holes, reducing electromagnetic pollution, enabling passive internet of everything, enabling large-scale receiving and transmitting with low cost, and increasing spatial degree of freedom of channels.

A basic principle of the intelligent surface is to generate a regulatable radiated electric field and obtain required radiation properties, by changing electromagnetic properties of the intelligent surface elements (IS element), in order to realize beam forming in transmitting or reflecting for multiple-input multiple-output (MIMO). The intelligent surface element is also referred as a regulatable electromagnetic unit. The electromagnetic properties that can be regulated and changed theoretically include: a phase, an amplitude, a frequency, a polarization, an angular momentum, and etc. The intelligent surface has the capability of changing electromagnetic properties, and have electromagnetic waves to be controlled in manners expected by users, therefore having a very broad application prospect.

Figure 1:
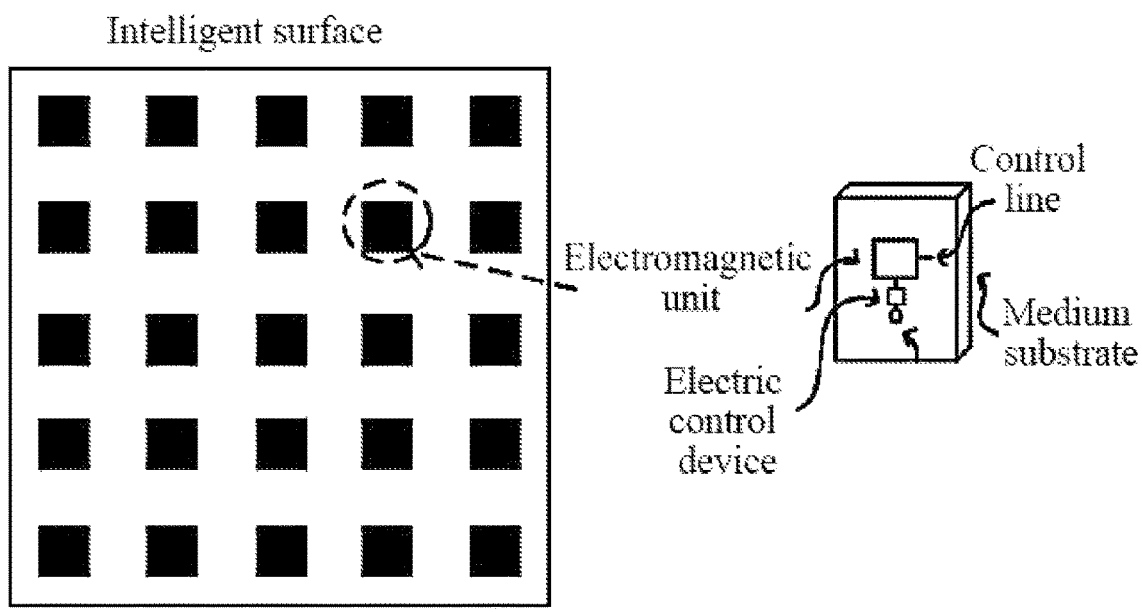
FIG. 1 is a schematic structural diagram of an intelligent surface in the related art.
Figure 2:
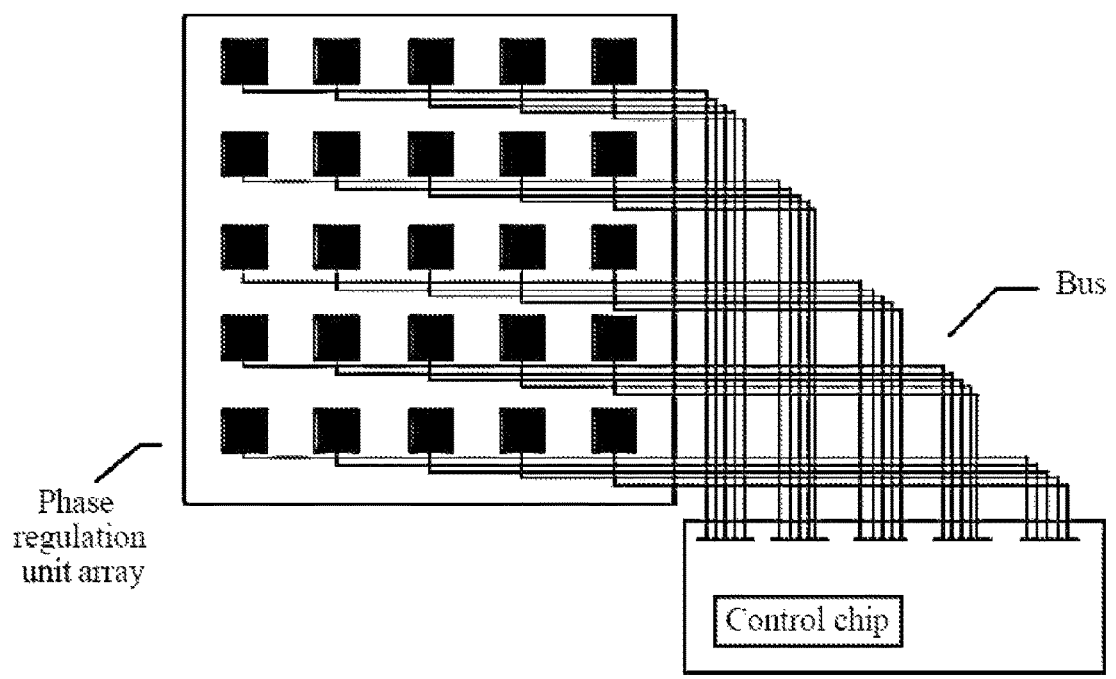
FIG. 2 is a schematic diagram showing an implementation of phase property regulation in the related art.
Figure 3:
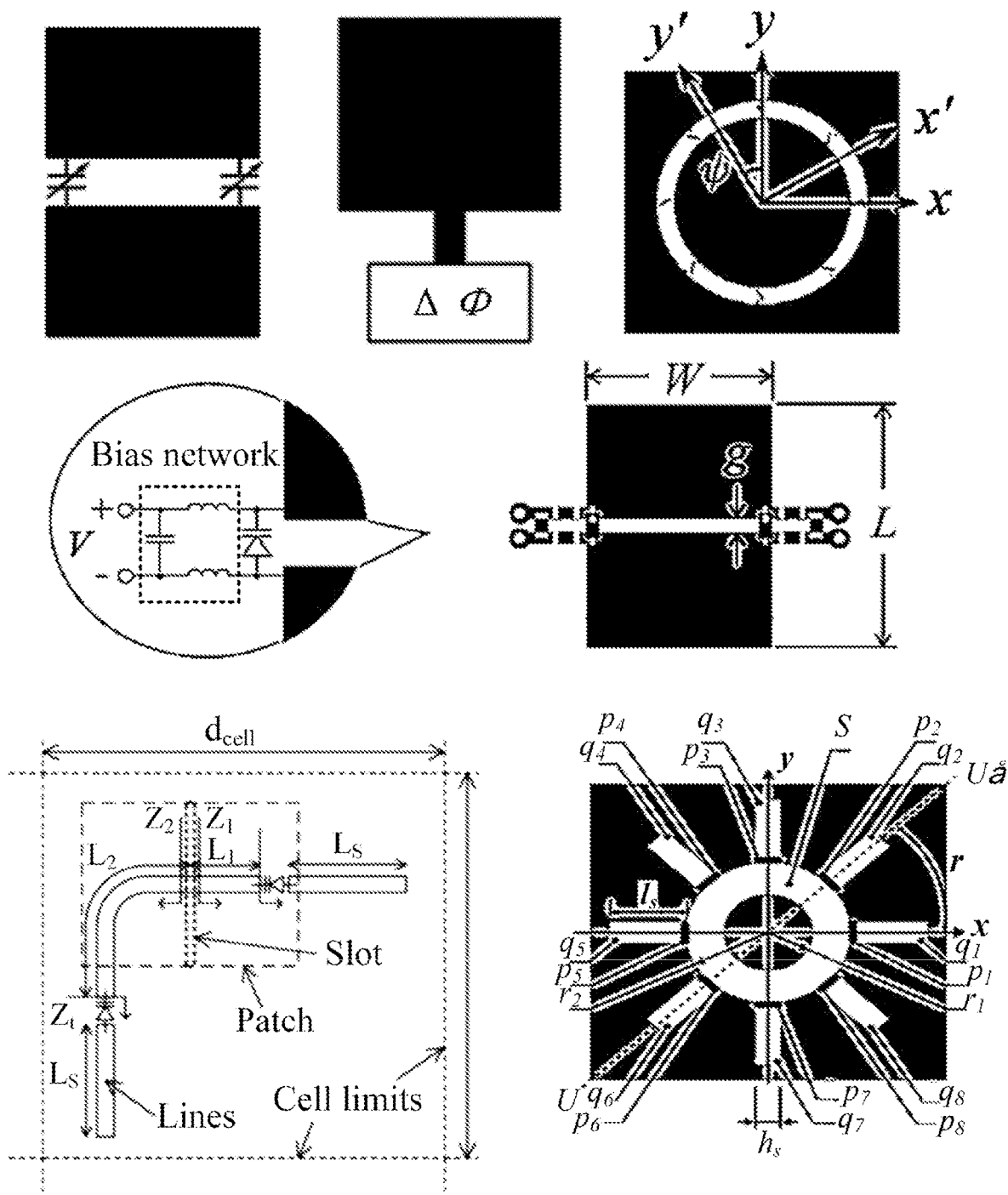
FIG. 3 is a schematic diagram showing an implementation of a regulatable electromagnetic unit according to an embodiment of the present disclosure.

FIG. 3 is a schematic diagram showing an implementation of a regulatable electromagnetic unit according to an embodiment of the present disclosure. The intelligent surface includes multiple regulatable electromagnetic units. As shown in FIG. 3, the regulatable electromagnetic units may be simple electronic components (such as diodes, triodes, capacitors, resistors, etc.), or may also be some media or apertures. Some simple ways to implement regulatable electromagnetic units are listed in FIG. 3. In practice, the electromagnetic units may be implemented in various manners, not limited to the following manners. The regulatable electromagnetic units on the intelligent surface are attached to a medium substrate, and the regulatable electromagnetic units can realize transmitting, reflection and transmission of electromagnetic waves.

Figure 4:
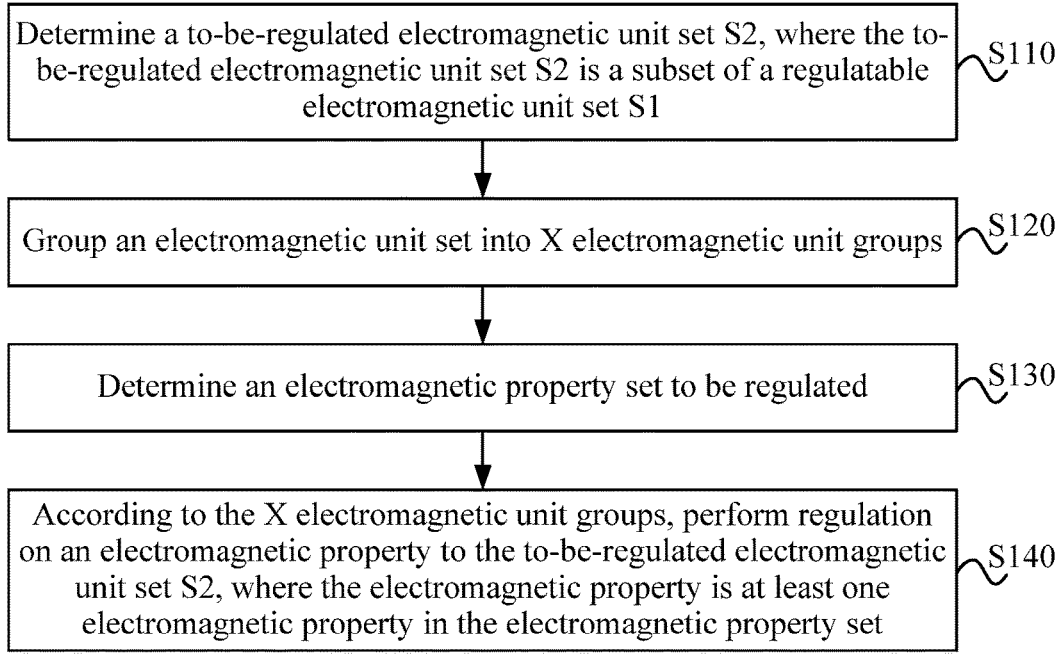
FIG. 4 is a flowchart of an electromagnetic unit regulation method according to an embodiment of the present disclosure.

FIG. 4 is a flowchart of an electromagnetic unit regulation method according to an embodiment of the present disclosure, the electromagnetic unit regulation method according to this embodiment is executed by an intelligent surface. As shown in FIG. 4, the method includes operations in S110, S120, S130 and S140.

Operation in S110 may include determining a to-be-regulated electromagnetic unit set S2, where the to-be-regulated electromagnetic unit set S2 is a subset of a regulatable electromagnetic unit set S1.

In an embodiment, the to-be-regulated electromagnetic unit set S2 refers to all the electromagnetic units required to be regulated on the intelligent surface; the regulatable electromagnetic unit set S1 includes all the electromagnetic units whose electromagnetic properties are regulatable on the intelligent surface. In an embodiment, the number of all electromagnetic units included in the to-be-regulated electromagnetic unit set S2 is less than or equal to all the electromagnetic units on the intelligent surface, that is, less than or equal to the number of all the electromagnetic units in the regulatable electromagnetic unit set S1.

Operation in S120 may include grouping an electromagnetic unit set into X electromagnetic unit groups.

In an embodiment, X is a positive integer greater than or equal to 1. In an embodiment, the electromagnetic unit set includes one of the to-be-regulated electromagnetic unit set S2 and the regulatable electromagnetic unit set S1. In an embodiment, the to-be-regulated electromagnetic unit set S2 may be grouped into X electromagnetic unit groups. In an embodiment, all the electromagnetic units on the intelligent surface may be grouped, that is, the regulatable electromagnetic unit set S1 may be grouped into X electromagnetic unit groups.

Operation in S130 may include determining an electromagnetic property set to be regulated.

In an embodiment, the electromagnetic property set to be regulated refers to one or more electromagnetic properties in an electromagnetic property set that are required to be regulated for all electromagnetic units in the to-be-regulated electromagnetic unit set. In an embodiment, one electromagnetic property in the electromagnetic property set may be regulated for all the electromagnetic units in the to-be-regulated electromagnetic unit set, or multiple electromagnetic properties in the electromagnetic property set may be regulated for all the electromagnetic units in the to-be-regulated electromagnetic unit set.

Operation in S140 may include according to the X electromagnetic unit groups, performing regulation on an electromagnetic property of the to-be-regulated electromagnetic unit set S2, and the electromagnetic property may be at least one electromagnetic property in the electromagnetic property set.

In an embodiment, one or more electromagnetic properties in an electromagnetic property set may be regulated for each electromagnetic unit group. The electromagnetic properties regulated for all electromagnetic units in the same electromagnetic unit group are the same. For example, after grouping electromagnetic units, an electromagnetic unit group A and an electromagnetic unit group B are obtained, and the electromagnetic unit group A and the electromagnetic unit group B both belong to the to-be-regulated electromagnetic unit set, then the electromagnetic property can be regulated for the electromagnetic unit group A and the electromagnetic unit group B separately. The electromagnetic properties regulated for the electromagnetic unit group A and the electromagnetic unit group B may be the same or different, which are not limited, and can be set according to user requirements, i.e., for the electromagnetic units in the same group, the electromagnetic properties to be regulated are the same, or regulation precisions are the same.

In an embodiment, before regulating the electromagnetic properties of the electromagnetic units, the electromagnetic unit set is grouped according to different conditions, so that the number of electromagnetic units to be regulated is less than or equal to the number of all the electromagnetic units on the intelligent surface, and the number of electromagnetic units to be regulated is greater than or equal to 1, so that the electromagnetic unit to be regulated is more targeted, the regulation efficiency is higher, and the regulation dimensions is reduced, thereby reducing the complexity of regulation.

In an embodiment, an order for performing operations in S110, S120 and S130 is not limited. In an embodiment, operations in S110, S120 and S130 may be executed in sequence, that is, determining the to-be-regulated electromagnetic unit set, grouping all the electromagnetic units in the to-be-regulated electromagnetic unit set into electromagnetic unit groups, and performing regulation on one or more electromagnetic properties in a pre-determined electromagnetic property set of the electromagnetic unit group. In an embodiment, if operation in S120 is performed after operation in S110, the electromagnetic units to be grouped are all electromagnetic units in the to-be-regulated electromagnetic unit set.

In an embodiment, operations in S120, S110, and S130 may be executed in sequence, that is, all electromagnetic units on the intelligent surface are grouped into at least two electromagnetic unit groups, and then a preset number of electromagnetic unit groups are selected from the at least two electromagnetic unit groups, as a to-be-regulated electromagnetic unit set, and according to the X electromagnetic unit groups, regulation on one or more electromagnetic properties in an electromagnetic property set of electromagnetic units in the to-be-regulated electromagnetic unit set is performed. In an embodiment, in a case where operation in S110 is performed after operation in S120, the electromagnetic units to be grouped are all the electromagnetic units on the intelligent surface.

In the above embodiment, operation in S130 may be executed before operation in S110 and operation in S120, and may also be executed after operation in S120 and operation in S120, which is not limited, as long as it can be ensured that operation in S130 is executed before S140.

In an embodiment, the determining a to-be-regulated electromagnetic unit set includes: determining the to-be-regulated electromagnetic unit set according to a first preset condition; or, determining that the to-be-regulated electromagnetic unit set S2 is equal to the regulatable electromagnetic unit set S1.

In an embodiment, the first preset condition includes one of or a combination of the following: a preset condition based on a working frequency of wireless communication; a preset condition based on a receiving power of an intelligent surface; a preset condition based on a type of a channel or a type of a signal; a preset condition based on a target user of downlink transmission; a preset condition based on a target access point of uplink transmission; a preset condition based on a type of a communication link; a preset condition based on content of control signaling sent by an access point (AP) or sent by a user equipment (UE); a preset condition based on a type of an electromagnetic property to be regulated; a preset condition based on regulation precision of an electromagnetic property; a preset condition based on regulation granularity of an electromagnetic property; a preset condition based on a modulation and coding scheme (MCS); a preset condition based on a dielectric coefficient, electric conductivity or magnetic permeability; a preset condition based on a usage of an IS; a preset condition based on a number of multiplexed transmission layers; a preset condition based on antenna configuration of a transmitting end or of a receiving end; a preset condition based on a transmitting power of an AP or of a UE, a preset condition based on pre-coding transmitted by an AP or by an UE or a beam transmitted by an AP or by an UE.

In an embodiment, a working frequency of wireless communication includes: a working frequency of transmitting, a working frequency of reflection, or, a working frequency of transmission; the working frequency of wireless communication is proportional to a number of electromagnetic units included in the to-be-regulated electromagnetic unit set.

In an embodiment, in a case where the first preset condition is the preset condition based on the receiving power of the intelligent surface, the determining the to-be-regulated electromagnetic unit set according to a first preset condition includes: determining a comparison result between a receiving power on a single electromagnetic unit or multiple electromagnetic units in the intelligent surface and a pre-configured power threshold value; in a case where the comparison result is that the receiving power of the single electromagnetic unit or of the multiple electromagnetic units is greater than or equal to the power threshold value, the single electromagnetic unit or the multiple electromagnetic units are added to the to-be-regulated electromagnetic unit set S2.

In an embodiment, the power threshold value may be determined according to one of the following: the power threshold value being a fixed value; the power threshold value being configured by a base station; the power threshold value being configured by a UE; the power threshold value being implicitly determined according to a target parameter. The target parameter includes one or more of the following: a working frequency of wireless communication, a dielectric coefficient, electric conductivity, magnetic permeability, a number of electromagnetic units, a number of multiplexed transmission layers, a type of an electromagnetic property to be regulated, a usage of an IS, MCS, a type of a communication link, a type of a channel or of a signal, a transmitting power of an AP or of a UE, pre-coding transmitted by an AP or by a UE or a beam transmitted by an AP or by a UE.

In an embodiment, the type of the channel or of the signal includes one of the following: a public control channel, a broadcast channel, a data channel, a synchronization signal, or, a pilot signal.

In an embodiment, a number of electromagnetic units included in the to-be-regulated electromagnetic unit set in a case where a type of a channel or of a signal is a public control channel, a broadcast channel or a synchronization signal is larger than a number of electromagnetic units included in the to-be-regulated electromagnetic unit set in a case where a type of a channel or of a signal is a data channel or a pilot frequency.

In an embodiment, the pilot signal includes: a measurement pilot and a demodulation pilot; and a number of electromagnetic units contained in a to-be-regulated electromagnetic unit set corresponding to the measurement pilot is larger than a number of electromagnetic units contained in a to-be-regulated electromagnetic unit set corresponding to the demodulation pilot.

In an embodiment, in a case where the first preset condition is the preset condition based on a target user of downlink transmission, the determining the to-be-regulated electromagnetic unit set according to a first preset condition includes: determining the to-be-regulated electromagnetic unit set according to a location of a target user of downlink transmission; or, determining the to-be-regulated electromagnetic unit set according to a number of target users of downlink transmission; or, determining the to-be-regulated electromagnetic unit set according to an identifier (ID) of a target user of downlink transmission.

In an embodiment, in a case where the first preset condition is the preset condition based on a target access point of uplink transmission, the determining the to-be-regulated electromagnetic unit set according to a first preset condition includes: determining the to-be-regulated electromagnetic unit set according to a location of a target access point of uplink transmission; or, determining the to-be-regulated electromagnetic unit set according to a number of target access points of uplink transmission; or determining the to-be-regulated electromagnetic unit set according to an ID of a target access point of uplink transmission.

In an embodiment, the type of the communication link includes one of the following: a downlink from an AP to a UE; an uplink from a UE to an AP; a sidelink from a UE to a UE; a backhaul link from an AP to an AP.

In an embodiment, an order of a modulation and decoding scheme is proportional to a number of electromagnetic units included in a to-be-regulated electromagnetic unit set.

In an embodiment, the dielectric coefficient is inversely proportional to a number of electromagnetic units included in a to-be-regulated electromagnetic unit set.

In an embodiment, a property of a to-be-regulated electromagnetic unit set includes at least one of the following: electromagnetic units being arranged in a rectangular arrangement, in a circular arrangement or in an annular arrangement; a number of electromagnetic units in a horizontal dimension being greater than a number of electromagnetic units in a vertical dimension; a distribution density of the electromagnetic units being uneven. In an embodiment, the distribution density of the electromagnetic units being uneven means that the distribution density of electromagnetic units is dense in center and sparse on an outer side.

Figure 5:
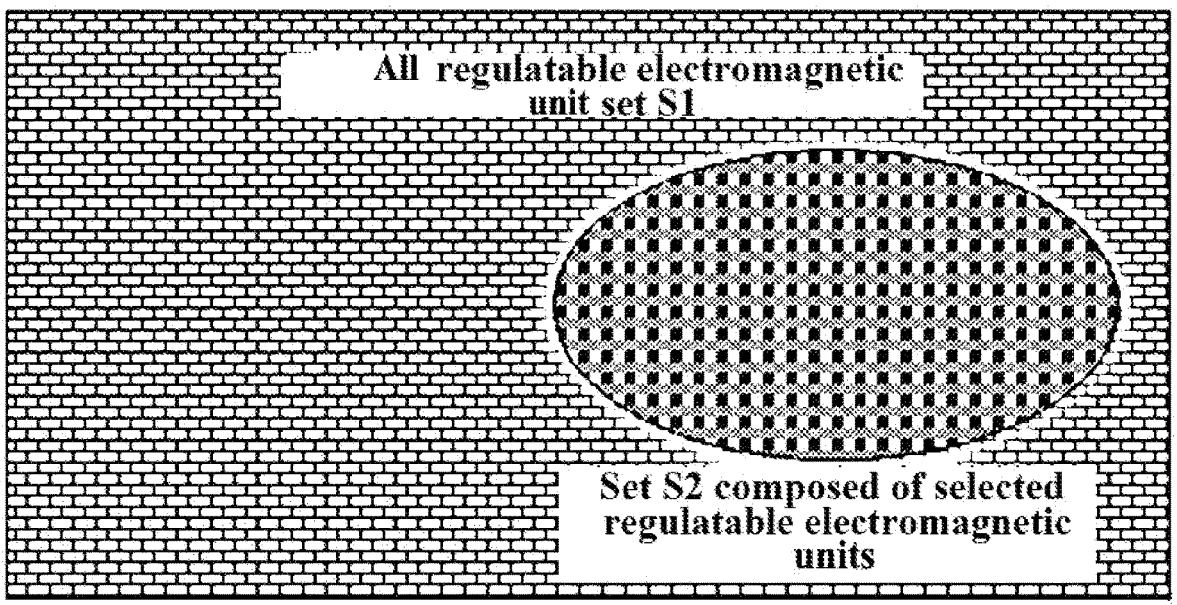
FIG. 5 is a schematic diagram showing a relationship between a to-be-regulated electromagnetic unit set and all electromagnetic units on an intelligent surface according to the present disclosure.

FIG. 5 is a schematic diagram showing a relationship between a to-be-regulated electromagnetic unit set and all electromagnetic units on an intelligent surface according to the present disclosure. As shown in FIG. 5, all of electromagnetic units on the intelligent surface is marked as S1, and the to-be-regulated electromagnetic unit set is marked as S2. In the related art, the to-be-regulated electromagnetic unit set S2 is just the entire set S1 composed of all available regulatable electromagnetic units on the intelligent surface, that is, the electromagnetic units included in S1 and those included in S2 are the same. In this embodiment of the present disclosure, a to-be-regulated electromagnetic unit set S2 suitable and required for current transmitting or reflection is selected from the entire set composed of all the regulatable electromagnetic units on the intelligent surface, that is, S2 is a subset of S1. Various factors may be considered for the selection of S2 from S1, and the to-be-regulated electromagnetic unit set S2 may be determined according to a first preset condition. Determining S2 includes, but is not limited to, determining the number of electromagnetic units included in S2, an interval between electromagnetic units included in S2, a distribution density of electromagnetic units included in S2, and a distribution pattern of electromagnetic units included in S2.

In an embodiment, the to-be-regulated electromagnetic unit set S2 is determined according to a first preset condition. In an embodiment, the first preset condition includes one of or a combination of the following: a preset condition based on a working frequency of wireless communication; a preset condition based on a receiving power of an intelligent surface; a preset condition based on a type of a channel or a type of a signal; a preset condition based on a target user of downlink transmission; a preset condition based on a target access point of uplink transmission; a preset condition based on a type of a communication link; a preset condition based on content of control signaling sent by an AP or by a UE; a preset condition based on a type of an electromagnetic property to be regulated; a preset condition based on regulation precision of an electromagnetic property; a preset condition based on regulation granularity of an electromagnetic property; a preset condition based on an MCS; a preset condition based on a dielectric coefficient, electric conductivity or magnetic permeability; a preset condition based on a usage of an IS; a preset condition based on a number of multiplexed transmission layers; a preset condition based on configuration of antenna of a transmitter or receiver; a preset condition based on a transmitting power of an AP or of a UE, pre-coding transmitted by an AP or by a UE or a beam transmitted by an AP or by a UE.

In an embodiment, in a case where the first preset condition is the preset condition based on the working frequency of wireless communication, for different working frequencies, for example, 30 GHz and 100 GHz, different electromagnetic units may be selected for the to-be-regulated electromagnetic unit set S2. In an embodiment, a working frequency of wireless communication includes a working frequency of transmitting, a working frequency of reflection, or, a working frequency of transmission. In an embodiment, the working frequency of the wireless communication is higher, the to-be-regulated electromagnetic unit set selected is larger (that is, including a greater number of electromagnetic units). In a process of practical operation, there is a coverage defect in high frequency, which can be compensated by using more intelligent surface elements. In an embodiment, a size of the set S2 may be determined according to the working frequency of wireless communication, for example, the sizes of the set S2 corresponding to different frequency values may be pre-negotiated.

In an embodiment, in a case where the first preset condition is the preset condition based on the receiving power of the intelligent surface, it may be determined according to a receiving power of one electromagnetic unit or of multiple electromagnetic units (which can be treated as one electromagnetic unit group) whether the one electromagnetic unit or the multiple electromagnetic units are added to the to-be-regulated electromagnetic unit set. If the receiving power of the one electromagnetic unit or of the multiple electromagnetic units is very low, it can be considered that a contribution made by the one electromagnetic unit or the multiple electromagnetic units to the transmission is very small, that is, it will not adversely affect the transmission performance if the one electromagnetic unit or the multiple electromagnetic units are not regulated. In an embodiment, a power threshold value may be set to determine the set S2. In a case where the receiving power of a single electromagnetic unit or of multiple electromagnetic units is smaller than the power threshold value, the single electromagnetic unit or the multiple electromagnetic units are not selected into the set S2. In a case where the receiving power of a single electromagnetic unit or of multiple electromagnetic units is greater than or equal to the power threshold value, the single electromagnetic unit or the multiple electromagnetic units can be selected into the set S2. In an embodiment, the power threshold value may be set as a fixed value, or not as a fixed value. For example, the power threshold value may be configured by a base station or a terminal, or implicitly determined according to other type of parameter configuration. For example, the other type of parameter includes one of the following: a working frequency of wireless communication; a type of a channel or of a signal; a target user for transmission or a target AP for transmission; a type of a communication link; a type of an electromagnetic property; regulation precision of an electromagnetic property; regulation granularity of an electromagnetic property; a modulation and coding scheme; a dielectric coefficient; a usage of an intelligent surface. With these parameters being different, power threshold values corresponding thereto may be set different. In addition, since the transmitting strategy of the AP or the UE affects the receiving power of the IS, the set S2 can also be determined by the configuration of parameters such as the transmit power and the precoding weight of the AP or the UE. Different transmit powers and pre-coding weights of an AP or UE may correspond to different selections for the set S2.

In an embodiment, in a case where the first preset condition is the preset condition based on the type of the channel or of the signal, different types of the channel or of the signal may correspond to different to-be-regulated electromagnetic unit sets. For example, a public control channel, a broadcast channel, a data channel, a synchronization signal, and a pilot signal each may correspond to a different set S2. The intelligent surface (IS) acquires information about the type of the channel or of the signal, and the IS determines the set S2 according to the information about the type of the channel or of the signal. In an embodiment, the public control channel and broadcast channel, and synchronization signal are used for multiple users, therefore more electromagnetic units can be selected, and the distribution of the selected electromagnetic units should be sufficiently wide; while, the data channel and the pilot signal is used for a specific terminal or a small number of terminals, part of the electromagnetic units closer to the target user can be selected to form the set S2 for transmitting, transmission or reflection transmission, and the number of the selected electromagnetic units can be smaller. In an embodiment, pilot signals can be divided into a measurement pilot signal and a demodulation pilot signal. The measurement pilot requires more electromagnetic units to be included in the set S2 than those required by the demodulation pilot. In an embodiment, only the set S2 is determined according to the type of or the characteristics of the channel or of the signal, can it be better adapted to the transmission of the channel. In an embodiment, the set S2 may also be determined according to the transmission content, for example, the set S2 may be determined according to different signaling or data, or according to importance of the signaling or data.

Figure 6:
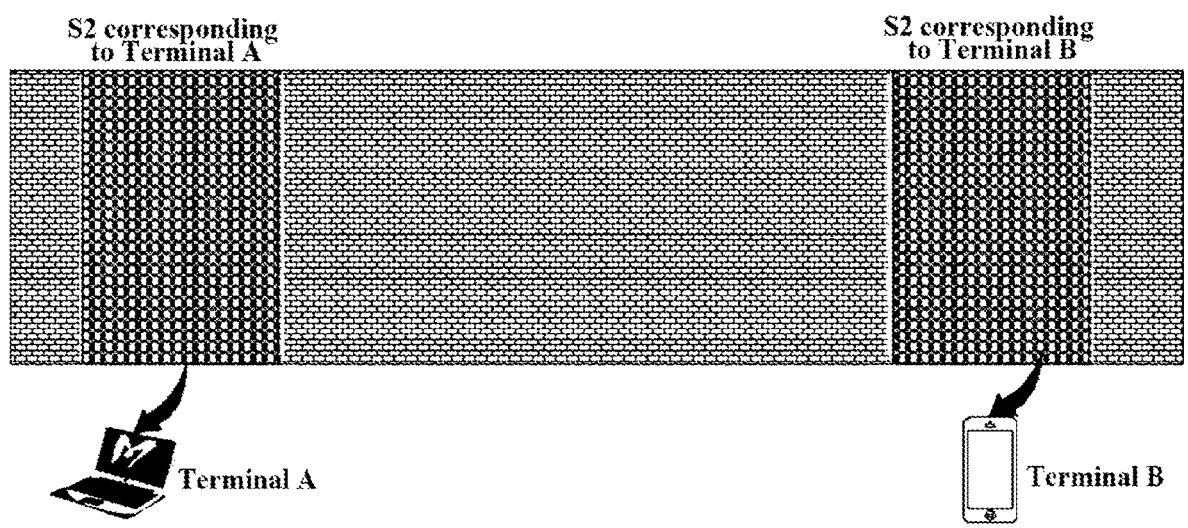
FIG. 6 is a schematic diagram showing a relationship between a location of a target user and a to-be-regulated electromagnetic unit set according to an embodiment of the present disclosure.

In an embodiment, the first preset condition is the preset condition based on a location of a target user of downlink transmission. An intelligent surface can be used for transmission for different users. In an embodiment, if the intelligent surface is larger, distances from different users to the electromagnetic units on the intelligent surface are different, and for users at different locations, the electromagnetic unit concentration regions having the greatest transmission effect on different users are different, that is, the set S2 may be determined according to the location of the target user of downlink transmission. In an embodiment, the distances from UEs in different locations to the IS are also different, and when the distance is longer, the set S2 required to be selected is larger. In an embodiment, during the wireless communication transmission, one user may be served, and multiple users may also be served. In an embodiment, FIG. 6 is a schematic diagram showing a relationship between a location of a target user and a to-be-regulated electromagnetic unit set according to an embodiment of the present disclosure. As shown in FIG. 6, terminal A and terminal B are each corresponding to one to-be-regulated electromagnetic unit set, where the distance between the terminal B and the IS is smaller than the distance between the terminal A and the IS, that is, a number of electromagnetic units included in the to-be-regulated electromagnetic unit set corresponding to the terminal A is larger.

Figure 7:
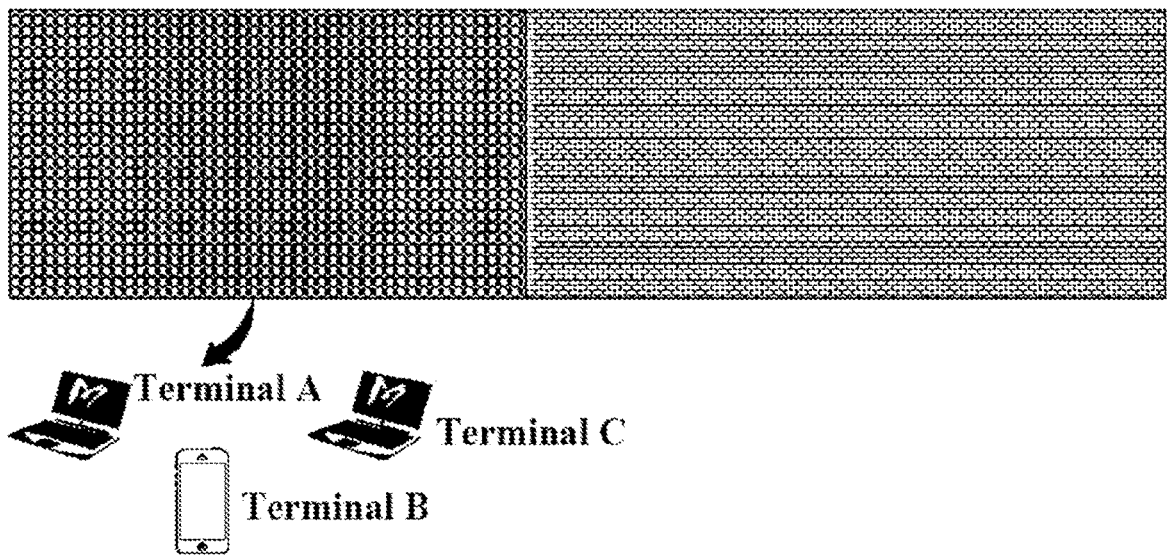
FIG. 7 is a schematic diagram showing a relationship between a number of target users and a to-be-regulated electromagnetic unit set according to an embodiment of the present disclosure.
Figure 7:
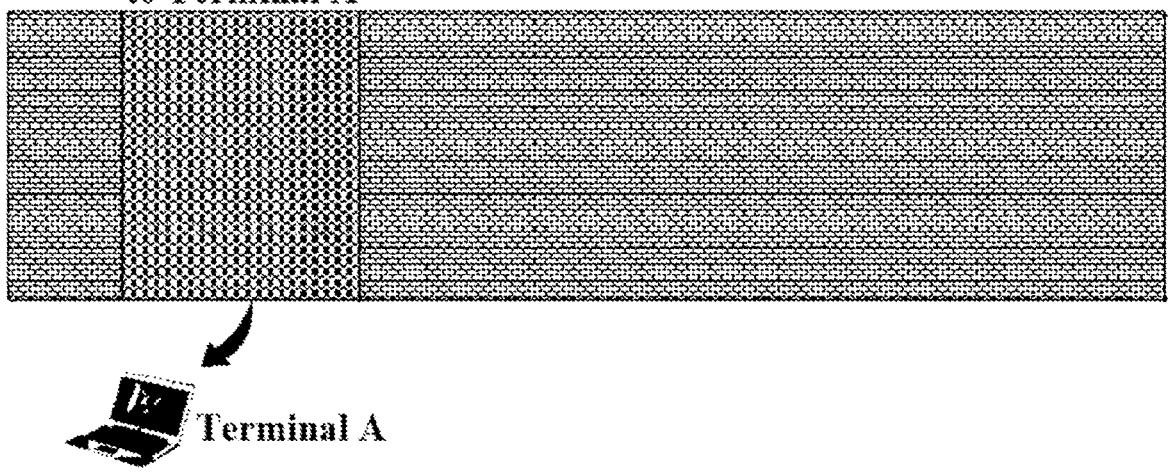

In an embodiment, the first preset condition is a preset condition based on the number of target users of downlink transmission. In an embodiment, in a case where the numbers of target users in downlink transmission are different, the selection for the set S2 corresponding thereto are also different, that is, the set S2 can be determined according to the number of target users served. FIG. 7 is a schematic diagram showing a relationship between a number of target users and a to-be-regulated electromagnetic unit set according to an embodiment of the present disclosure. As shown in FIG. 7, the number of target users served in an upper drawing includes three users, terminal A, terminal B, and terminal C; while the number of target users served in a lower drawing includes one user, terminal A, that is, a number of electromagnetic units included in the electromagnetic unit set corresponding to the number of target users being three is greater than the number of electromagnetic units included in the electromagnetic unit set corresponding to the number of target users being one.

Figure 8:
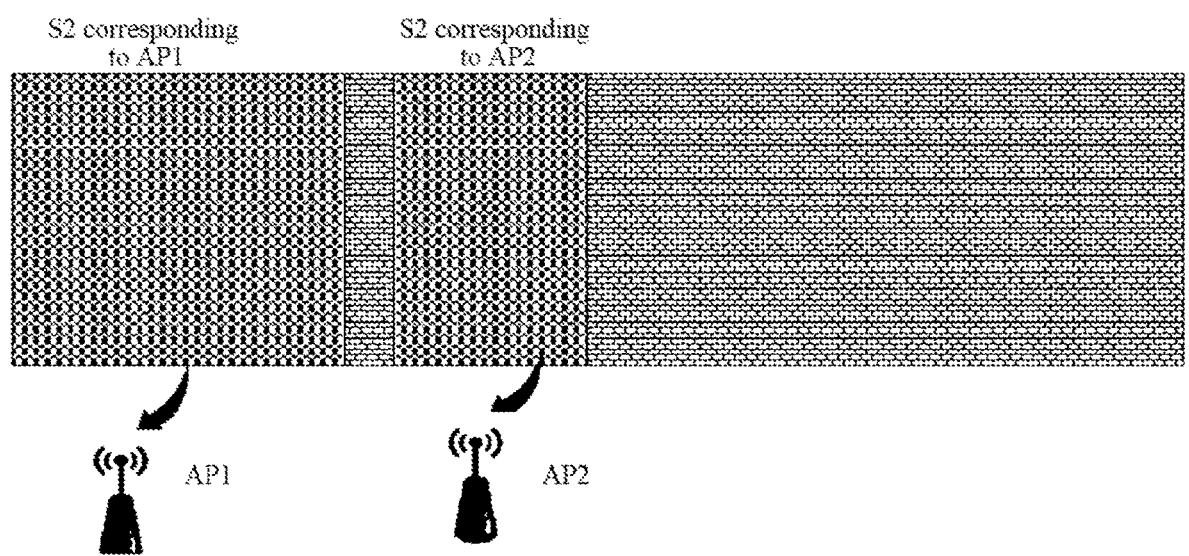
FIG. 8 is a schematic diagram of a relationship between a location of a target AP and a to-be-regulated electromagnetic unit set according to an embodiment of the present disclosure.

In an embodiment, the first preset condition is a preset condition based on a location of a target AP of uplink transmission. The intelligent surface can be configured to transmit and reflect to different target Aps in the process of uplink transmission. Different APs have different locations. Therefore, different sets S2 can be selected to transmit or reflect to optimize the transmission performance. FIG. 8 is a schematic diagram of a relationship between a location of a target AP and a to-be-regulated electromagnetic unit set according to an embodiment of the present disclosure. As shown in FIGS. 8, AP1 and AP2 each correspond to one to-be-regulated electromagnetic unit set, where, the distance between the AP2 and the IS is shorter than the distance between the AP1 and the IS, that is, a number of electromagnetic units included in the to-be-regulated electromagnetic unit set corresponding to AP1 is larger.

Figure 9:
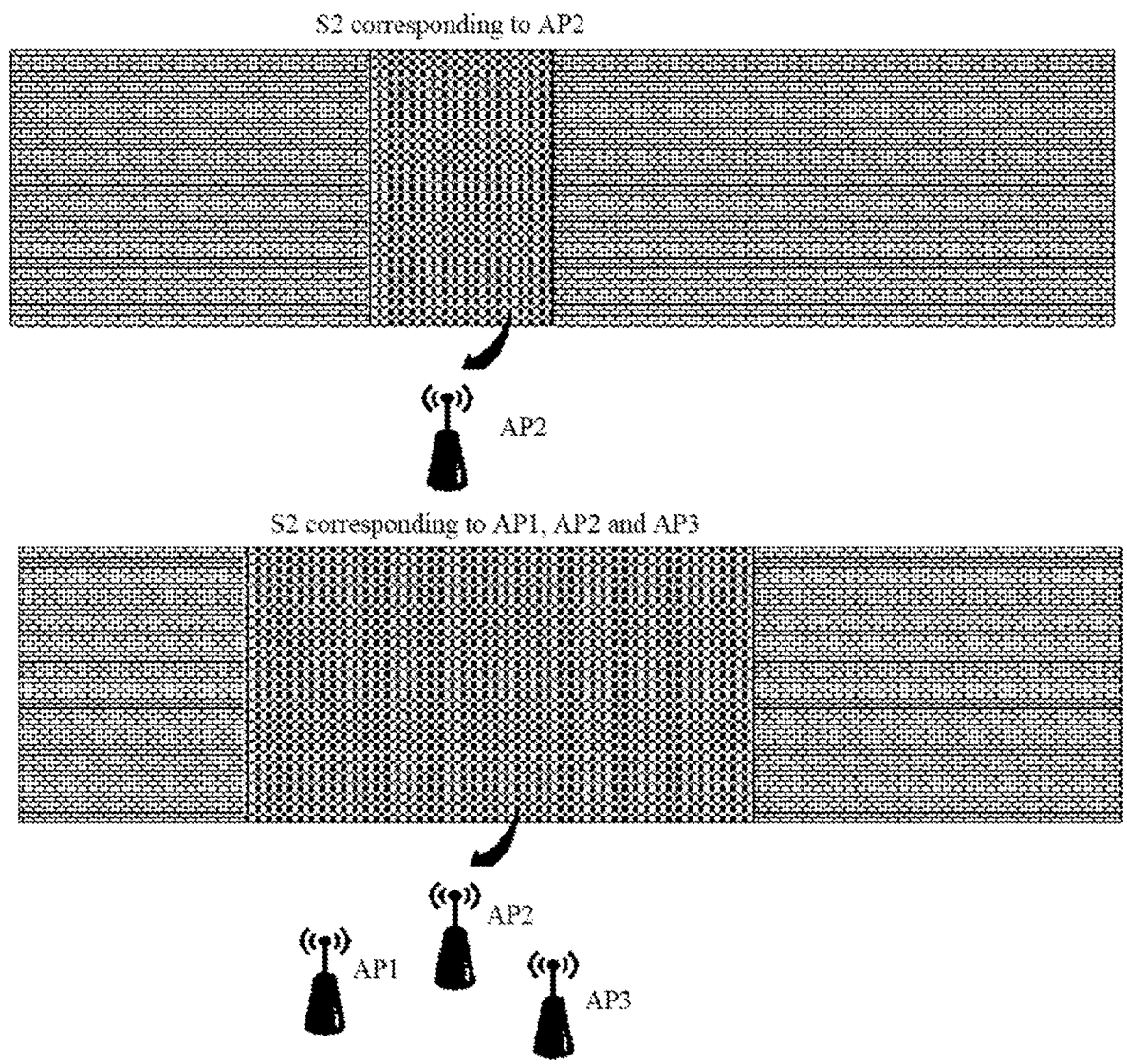
FIG. 9 is a schematic diagram of a relationship between a number of target APs and a to-be-regulated electromagnetic unit set according to an embodiment of the present disclosure.

In an embodiment, the first preset condition is a preset condition based on the number of target APs of uplink transmission. In an embodiment, during the uplink transmission, one AP may be served to receive, and multiple APs may also be served to receive jointly. When the numbers of target APs are different, the selection for the set S2 corresponding thereto are also different, that is, the set S2 can be determined according to the number of target APs served. FIG. 9 is a schematic diagram of a relationship between a number of target APs and a to-be-regulated electromagnetic unit set according to an embodiment of the present disclosure. As shown in FIG. 9, the number of target APs served in an upper drawing includes one AP, AP2; while the number of target APs served in a lower drawing includes three Aps, AP1, AP2 and AP3, that is, a number of electromagnetic units included in the electromagnetic unit set corresponding to the number of target APs being three is greater than the number of electromagnetic units included in the electromagnetic unit set corresponding to the number of target APs being one.

In an embodiment, the first preset condition is a preset condition based on a type of a communication link. In an embodiment, the intelligent surface may be used for various types of links, e.g., a downlink from an AP to a UE, an uplink from a UE to an AP, a sidelink between a UE to another UE, a backhaul link between an AP and an AP. In an embodiment, the sets S2 corresponding to different types of communication links are different, that is, different sets S2 can be selected for transmitting or reflection according to the types of the communication links. In the process of practical operation, due to the limited coverage of the uplink, a number of electromagnetic units included in the set S2 corresponding to the uplink transmission is greater than the number of electromagnetic units included in the set S2 corresponding to the downlink transmission, that is, the set S2 corresponding to the downlink transmission may be a subset of the set S2 corresponding to the uplink transmission.

In an embodiment, the first preset condition is a preset condition based on content of control signaling sent by an AP or by a UE. In an embodiment, the intelligent surface determines, according to the received control signaling sent by the AP or the UE, how to select electromagnetic units from the S1 set to form the set S2. In an embodiment, the control signaling may directly specify which electromagnetic units constitute the set S2, or, the control signaling may be combined with some configuration parameters (for example, a working frequency of wireless communication, a reception frequency on the intelligent surface, a type of a channel or of a signal, a type of a communication link, etc.) mentioned in other embodiments in the present application to determine which electromagnetic units constitute the set S2.

In an embodiment, the first preset condition is a preset condition based on a type of an electromagnetic property to be regulated. In an embodiment, the intelligent surface determines the type of an electromagnetic property to be controlled, and determines according to the type of the electromagnetic property how to select the electromagnetic units from the S1 set to form the set S2. For example, regulation on a phase property corresponds to a set $S_{2\text{-}phase}$, regulation on an amplitude property corresponds to a set $S_{2\text{-}am}$, regulation on a frequency property corresponds to a set $S_{2\text{-}rf}$, and regulation on an orbital angular momentum property corresponds to a set $S_{2\text{-}oam}$, and regulation on a spin angular momentum property corresponds to a set $S_{2\text{-}sam}$.

In an embodiment, the first preset condition is a preset condition based on regulation precision of an electromagnetic property. In an embodiment, the intelligent surface determines the regulation precision of an electromagnetic property, (for example, regulation precision of binary phase shift keying (BPSK) including two phase values, regulation precision of quadrature phase shift keying (QPSK) including four phase values), and determines, according to the regulation precision of the electromagnetic property, how to select electromagnetic units from the S1 set to form the set S2. For example, the regulation of phase of BPSK corresponds to a set $S_{2\text{-}bpsk}$, and the phase regulation of QPSK corresponds to a set $S_{2\text{-}qpsk}$.

In an embodiment, the first preset condition is a preset condition based on regulation granularity of an electromagnetic property. In an embodiment, the intelligent surface determines regulation granularity of the electromagnetic property, for example, the regulation granularity is based on the regulation of each electromagnetic unit, or based on the joint regulation of a group of electromagnetic units, each group including N electromagnetic units. It is determined according to the regulation granularity how to select electromagnetic units from the S1 set to form the set S2. The regulation granularity can be characterized not only by the number of electromagnetic units, but also by the area of electromagnetic units. For the regulations based on the same number of electromagnetic units, when the areas of electromagnetic units are different, the regulation granularities are different. For example, the regulation granularities may be described as a granularity of 1 cm$^2$, a granularity of 0.5 cm$^2$, or, a granularity of 0.25 cm$^2$.

In an embodiment, the first preset condition is a preset condition based on an MCS. In an embodiment, different MCSs requires different sizes of the S2 set. For example, the set S2 corresponding to a high-order MCS includes a larger number of electromagnetic units. In an embodiment, a higher-order MCS requires better transmission performance and more robust channel conditions, otherwise a large amount of data will be transmitted inaccurately and resources will be wasted significantly. In an embodiment, the set S2 may be determined according to the MCS, that is, for a higher-order MCS transmission, the set S2 includes more electromagnetic units.

In an embodiment, the first preset condition is a preset condition based on the dielectric coefficient, electric conductivity or magnetic permeability. In an embodiment, different dielectric coefficients require different sizes of the set S2. For example, the set S2 corresponding to a small dielectric coefficient includes a larger number of electromagnetic units. In an embodiment, the set S2 may be determined according to the dielectric coefficient. In an embodiment, the set S2 may also be determined according to the electric conductivity and the magnetic permeability, that is, the sets S2 corresponding to different electric conductivities are different; and the sets S2 corresponding to different magnetic permeabilities are different.

Figure 10:
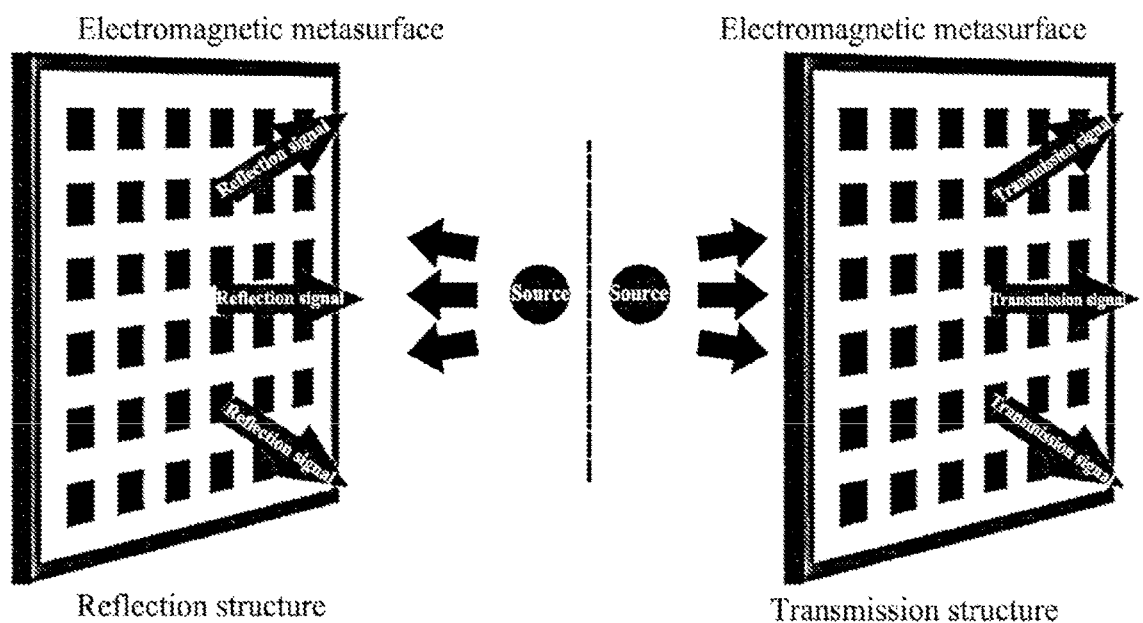
FIG. 10 is a schematic principle diagram of different IS usages according to an embodiment of the present disclosure.

In an embodiment, the first preset condition is a preset condition based on a usage of an IS. In an embodiment, the usage of IS can be divided into three types: transmitting, reflection, and transmission. In an embodiment, when a usage of an IS is transmitting, that is, the IS is used as an antenna, a signal is directly fed to the back of the IS, which pertains to an active utilization mode. When the usage of IS is reflection or transmission, it is a passive utilization mode, and what is generated by the electromagnetic unit is an induced current. FIG. 10 is a schematic principle diagram of different IS usages according to an embodiment of the present disclosure. As shown in FIG. 10, when the usage of IS is reflection or transmission, the corresponding reflection signal or transmission signal is transmitted from the electromagnetic meta-surface, which pertains to a passive utilization mode. In an embodiment, the transmission characteristics of these modes are different, and the requirements for the electromagnetic units are also different, that is, different sets S2 can be selected according to the usages of the IS.

In an embodiment, the first preset condition is a preset condition based on a number of multiplexed transmission layers. In an embodiment, when the multiplexed transmission layers are more, a number of electromagnetic units included in the corresponding set S2 is larger, and the electromagnetic units are optionally distributed in a long narrow and flat distribution.

In an embodiment, the first preset condition is a preset condition based on a configuration of antenna for a transmitting end or for a receiving end. In an embodiment, the configuration of antenna for the transmitting end or for the receiving end affects the transmitting beam or the receiving beam, that is, affecting effective electromagnetic unit distribution. For example, when the number of elements in the horizontal dimension at the transmitting end or the receiving end is very large, it means that the wave beam will be very narrow, that is, the number of elements in the horizontal dimension can be smaller, or the intervals between the elements can be smaller.

In an embodiment, a characteristic of the to-be-regulated electromagnetic unit set S2 includes one of the following: electromagnetic units being arranged in a rectangular arrangement, in a circular arrangement or in an annular arrangement; a number of electromagnetic units in the horizontal dimension being greater than a number of electromagnetic units in the vertical dimension; a distribution density of the electromagnetic units being dense on an inner side and sparse on an outer side; electromagnetic units being of one or more multiple intelligent surfaces; electromagnetic units being multiple electromagnetic unit elements on each intelligent surface; electromagnetic units being discretely interleaved; electromagnetic units being arranged in a solid or hollow rectangle; electromagnetic units being arranged in a solid or hollow rhombus; electromagnetic units being arranged in a solid or hollow circle.

In an embodiment, the distribution density of electromagnetic units being uneven, includes one of the following: a distribution density of electromagnetic units on an inner side of an intelligent surface being greater than or equal to a distribution density of electromagnetic units on an outer side of a same intelligent surface; a distribution density of electromagnetic units on a left side of an intelligent surface is greater than or equal to a distribution density of electromagnetic units on a right side of a same intelligent surface; a distribution density of electromagnetic units on a right side of an intelligent surface being greater than or equal to a distribution density of electromagnetic units on a left side of a same intelligent surface; a distribution density of electromagnetic units on an upper side of an intelligent surface being greater than or equal to a distribution density of electromagnetic units on a lower side of a same intelligent surface; and a distribution density of electromagnetic units on a lower side of an intelligent surface being greater than or equal to a distribution density of electromagnetic units on an upper side of a same intelligent surface.

Figure 11:
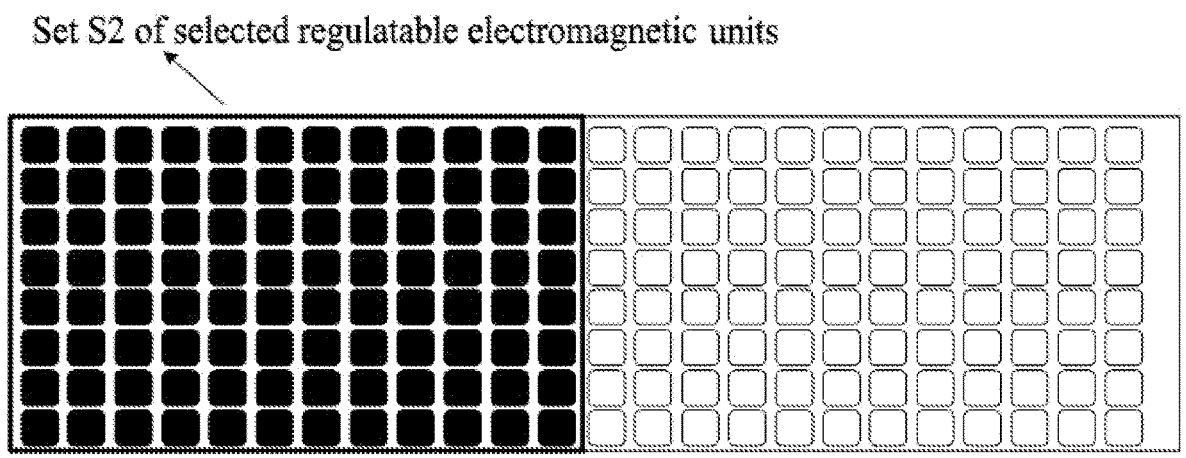
FIG. 11 is a schematic display diagram of a to-be-regulated electromagnetic unit set according to an embodiment of the present disclosure.

In an embodiment, FIG. 11 is a schematic display diagram of a to-be-regulated electromagnetic unit set according to an embodiment of the present disclosure. As shown in FIG. 11, a part of electromagnetic units can be selected from all the electromagnetic units on the intelligent surface, as all the electromagnetic units in the to-be-regulated electromagnetic unit set.

Figure 12:
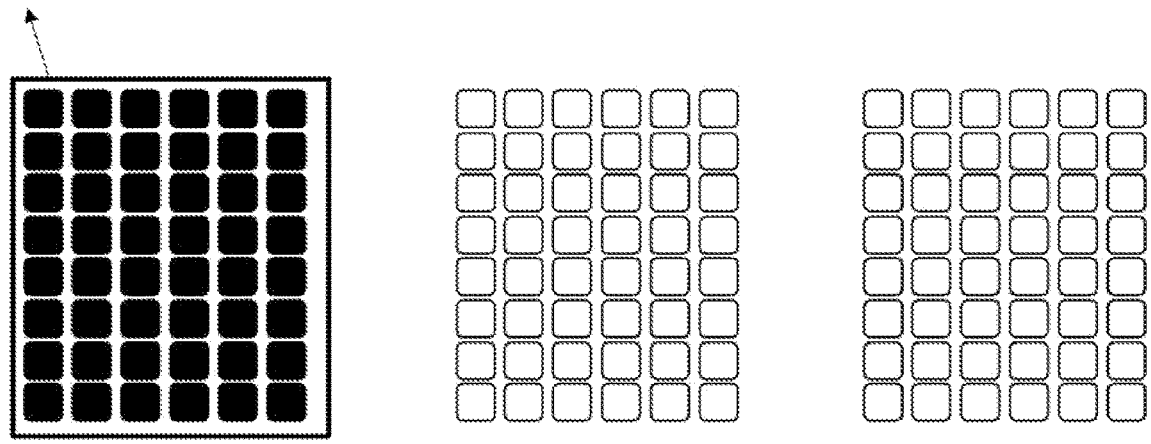
FIG. 12 is a schematic display diagram of another to-be-regulated electromagnetic unit set according to an embodiment of the present disclosure.

In an embodiment, the to-be-regulated electromagnetic unit set S2 is one or more of multiple intelligent surfaces. FIG. 12 is another schematic display diagram of a to-be-regulated electromagnetic unit set according to an embodiment of the present disclosure. As shown in FIG. 12, all the electromagnetic units on one intelligent surface may be selected from multiple intelligent surfaces each having electromagnetic units arranged in a rectangular manner, as all the electromagnetic units in the to-be-regulated electromagnetic unit set.

Figure 13:
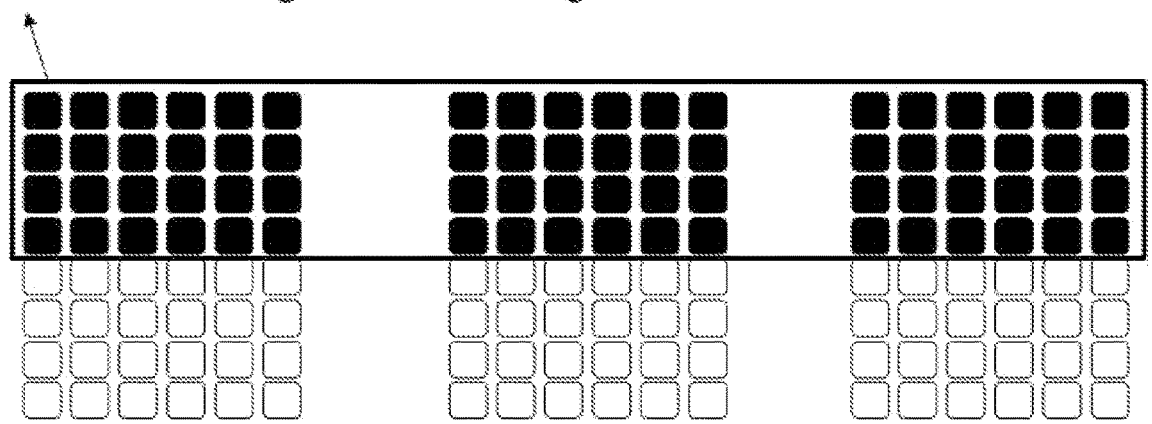
FIG. 13 is a schematic display diagram of yet another to-be-regulated electromagnetic unit set according to an embodiment of the present disclosure.

In an embodiment, the to-be-regulated electromagnetic unit set S2 is multiple electromagnetic unit elements in each intelligent surface. FIG. 13 is a schematic display diagram of yet another to-be-regulated electromagnetic unit set according to an embodiment of the present disclosure. As shown in FIG. 13, a part of electromagnetic unit elements in a rectangular arrangement can be selected from each electromagnetic unit intelligent surface, as all the electromagnetic units in the to-be-regulated electromagnetic unit set.

Figure 14:
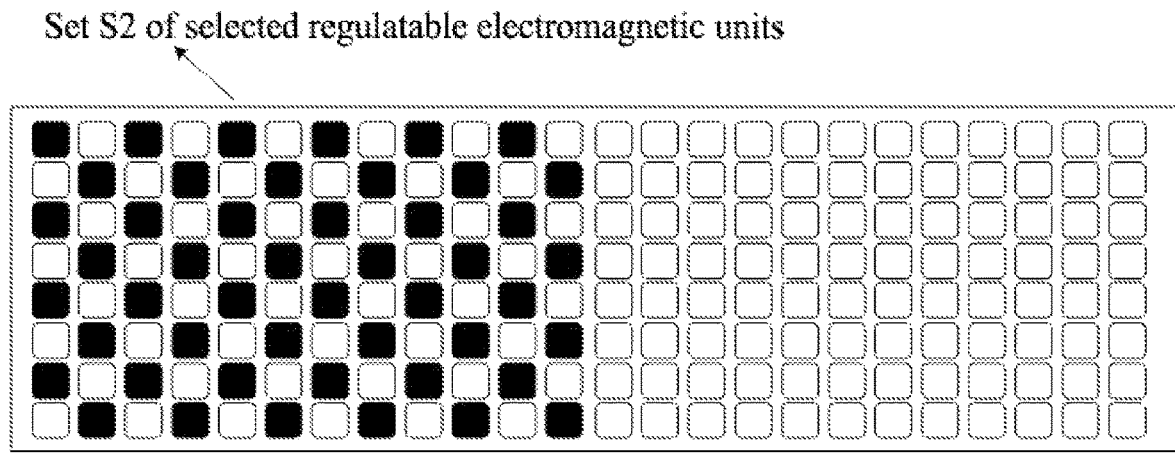
FIG. 14 is a schematic display diagram of still another to-be-regulated electromagnetic unit set according to an embodiment of the present disclosure.

In an embodiment, the to-be-regulated electromagnetic unit set S2 is arranged in a discretely interleaved manner. FIG. 14 is a schematic display diagram of still another to-be-regulated electromagnetic unit set according to an embodiment of the present disclosure. As shown in FIG. 14, a part of electromagnetic units in a discrete and interleaved arrangement may be selected from all the electromagnetic units on the intelligent surface, as all the electromagnetic units in the to-be-regulated electromagnetic unit set.

Figure 15:
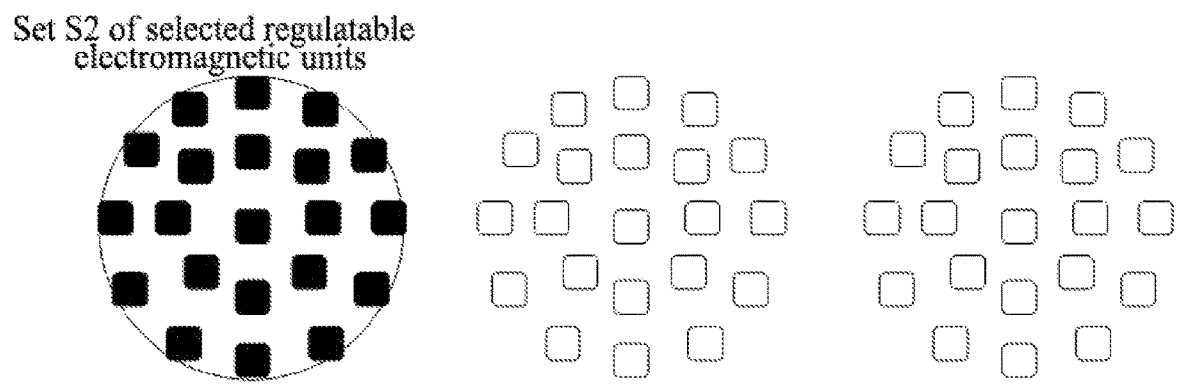
FIG. 15 is a schematic display diagram of still another to-be-regulated electromagnetic unit set according to an embodiment of the present disclosure.

In an embodiment, FIG. 15 is a schematic display diagram of still another to-be-regulated electromagnetic unit set according to an embodiment of the present disclosure. As shown in FIG. 15, one electromagnetic unit group may be selected from multiple electromagnetic unit groups having electromagnetic units arranged in a circular shape after the electromagnetic unit set is grouped, as all electromagnetic units in the to-be-regulated electromagnetic unit set.

Figure 16:
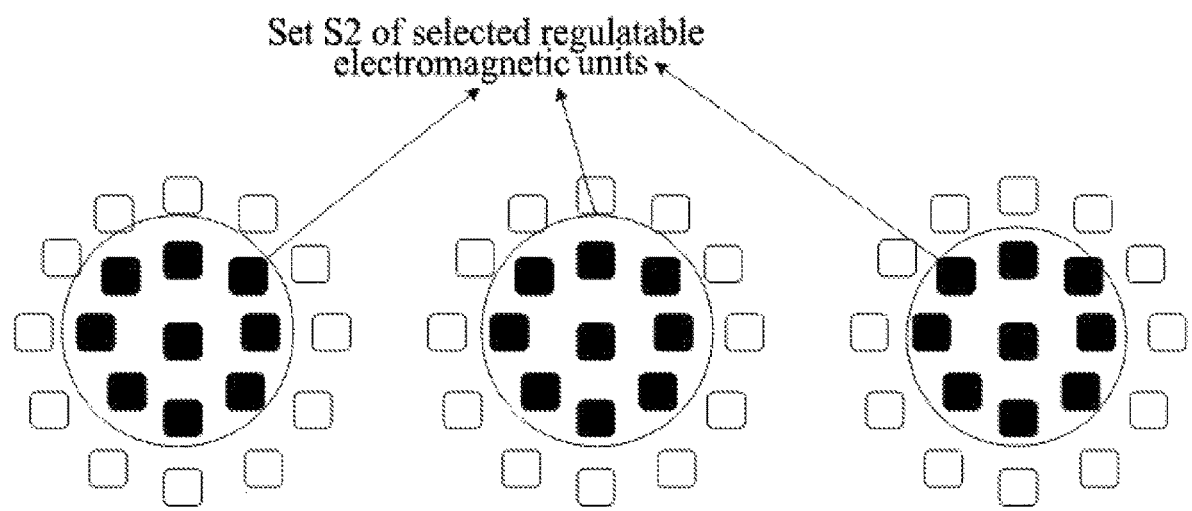
FIG. 16 is a schematic display diagram of still another to-be-regulated electromagnetic unit set according to an embodiment of the present disclosure.

In an embodiment, FIG. 16 is a schematic display diagram of still another to-be-regulated electromagnetic unit set according to an embodiment of the present disclosure. As shown in FIG. 16, a part of electromagnetic units may be selected in a circular arrangement from each electromagnetic unit group after the electromagnetic unit set is grouped, as all electromagnetic units in the to-be-regulated electromagnetic unit set.

Figure 17:
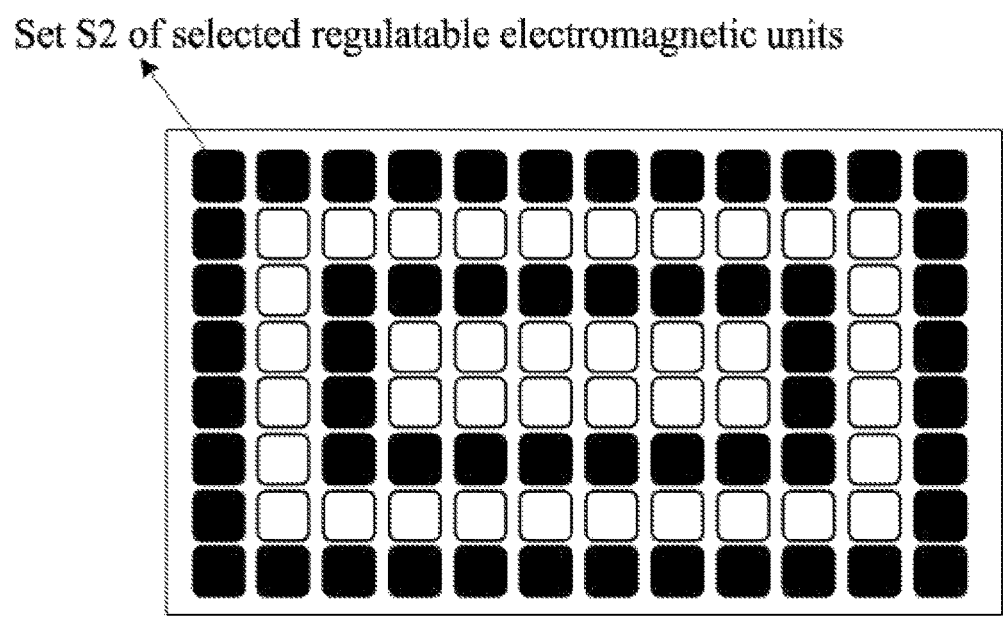
FIG. 17 is a schematic display diagram of still another to-be-regulated electromagnetic unit set according to an embodiment of the present disclosure.

In an embodiment, FIG. 17 is a schematic display diagram of still another to-be-regulated electromagnetic unit set according to an embodiment of the present disclosure. As shown in FIG. 17, a part of electromagnetic units may be selected in an annular arrangement from all the electromagnetic units on the intelligent surface, as all electromagnetic units in the to-be-regulated electromagnetic unit set.

Figure 18:
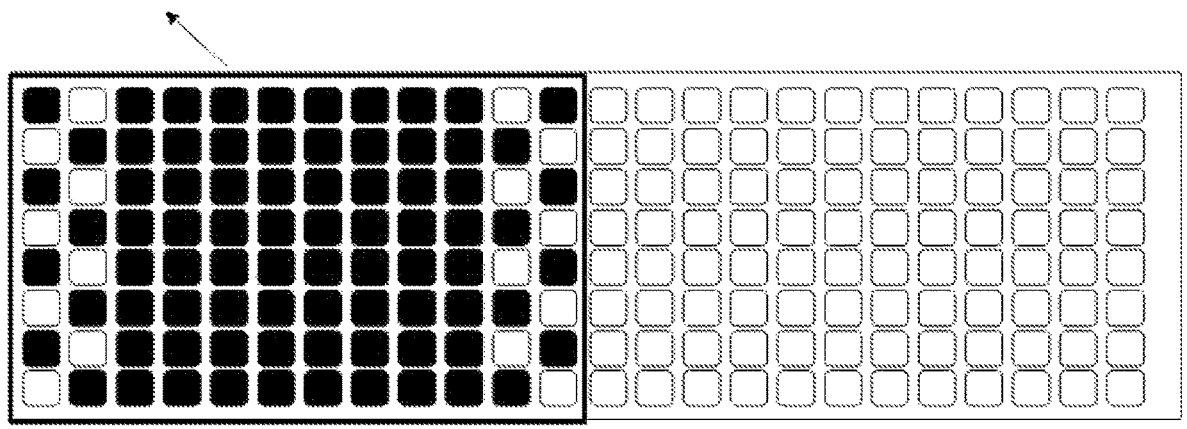
FIG. 18 is a schematic display diagram of still another to-be-regulated electromagnetic unit set according to an embodiment of the present disclosure.

In an embodiment, the to-be-regulated electromagnetic unit set S2 has electromagnetic units arranged dense on an outer side and sparse on an inner side. FIG. 18 is a schematic display diagram of still another to-be-regulated electromagnetic unit set according to an embodiment of the present disclosure. As shown in FIG. 18, a part of electromagnetic units in a distributed arrangement may be selected from all the electromagnetic units on the intelligent surface as all electromagnetic units in the to-be-regulated electromagnetic unit set. Also, a number of electromagnetic units selected from the inner side of the intelligent surface is larger than the number of electromagnetic units selected from the outer side of the intelligent surface.

Figure 19:
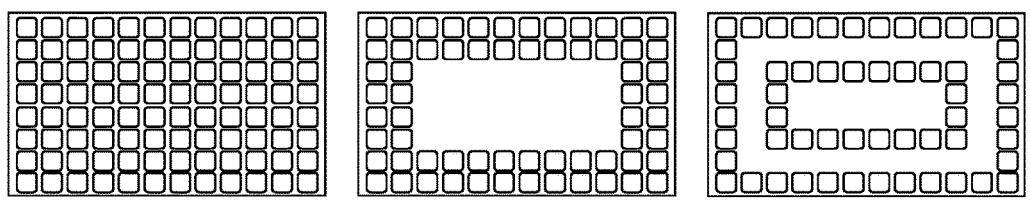
FIG. 19 is a schematic structural diagram of an electromagnetic unit element according to an embodiment of the present disclosure.
Figure 20:
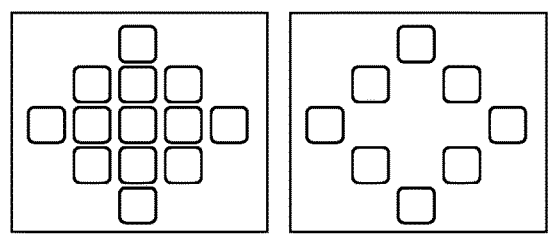
FIG. 20 is a schematic structural diagram of another electromagnetic unit element according to an embodiment of the present disclosure.
Figure 21:
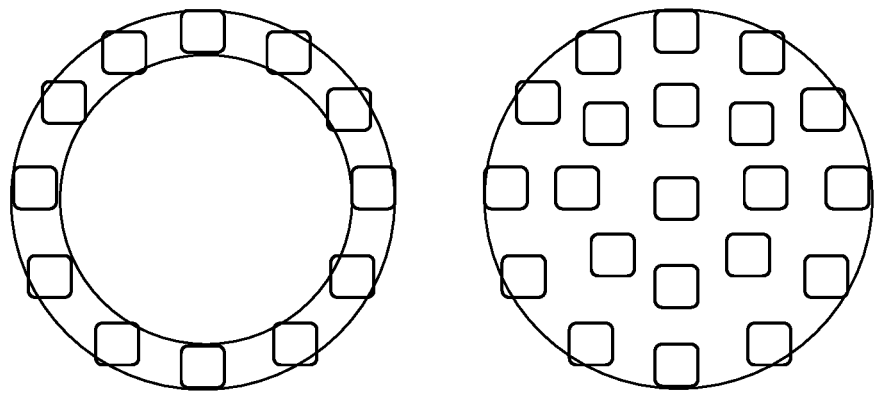
FIG. 21 is a schematic structural diagram of another electromagnetic unit element according to an embodiment of the present disclosure.

In an embodiment, the to-be-regulated electromagnetic unit set S2 selected may be distributed in an arrangement which may be one of or a combination of the following arrangements. In an embodiment, the electromagnetic unit elements included in the set S2 may be distributed in an arrangement which may be one of or a combination of the following arrangements. In an embodiment, the to-be-regulated electromagnetic unit set S2 is arranged in a solid or hollow rectangle. FIG. 19 is a schematic structural diagram of an electromagnetic unit element according to the embodiment of the present disclosure. As shown in FIG. 19, the electromagnetic unit elements included in the to-be-regulated electromagnetic unit set is arranged in a solid or hollow rectangle. In an embodiment, the to-be-regulated electromagnetic unit set S2 is arranged in a solid or hollow rhombus. FIG. 20 is a schematic structural diagram of another electromagnetic unit element according to the embodiment of the present disclosure. As shown in FIG. 20, the electromagnetic unit elements included in the to-be-regulated electromagnetic unit set is arranged a solid or hollow rhombus. In an embodiment, the to-be-regulated electromagnetic unit set S2 is arranged in a solid or hollow circle. FIG. 21 is a schematic structural diagram of another electromagnetic unit element according to the embodiment of the present disclosure. As shown in FIG. 21, the electromagnetic unit elements included in the to-be-regulated electromagnetic unit set is arranged in a circle, a circular ring, or multiple circular rings.

In the embodiments, the arrangements of the electromagnetic unit elements described in the above embodiments are used, which can facilitate the design of the control circuit and the grouping.

Figure 22:
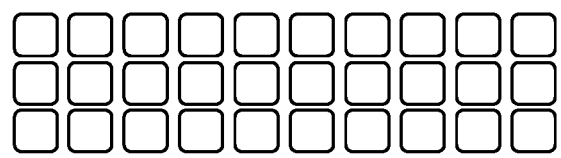
FIG. 22 is a distribution diagram showing an arrangement of electromagnetic units in a to-be-regulated electromagnetic unit set according to an embodiment of the present disclosure.

In an embodiment, when to determine the to-be-regulated electromagnetic unit set, the determination may be performed according to at least one of the following characteristics: the number of electromagnetic units in the horizontal dimension being greater than the number of electromagnetic units in the vertical dimension; the distribution density of electromagnetic units is uneven. In an embodiment, as many electromagnetic units as possible are distributed in the horizontal dimension, that is, a number of electromagnetic units in the horizontal dimension is greater than the number of electromagnetic units in the vertical dimension, so that the communication performance is better. In one aspect, the power received by the IS is larger, and in another aspect, the non-correlation of channels is better improved, and more layers can be transmitted. FIG. 22 is a distribution diagram showing an arrangement of electromagnetic units in a to-be-regulated electromagnetic unit set according to the embodiment of the present disclosure. As shown in FIG. 22, the number of electromagnetic units in the horizontal dimension is larger than the number of electromagnetic units in the vertical dimension. In an embodiment, a combination of electromagnetic units in an elongated shape and in a flat shape is more suitable for multi-layer transmission.

Figure 23:
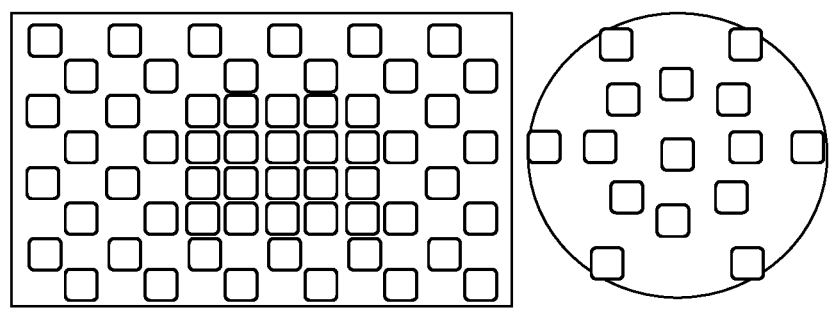
FIG. 23 is a distribution diagram showing an arrangement of electromagnetic units in another to-be-regulated electromagnetic unit set according to an embodiment of the present disclosure.

In an embodiment, the distribution density of electromagnetic units selected in the to-be-regulated electromagnetic unit set may be uneven. FIG. 23 is a distribution diagram showing an arrangement of electromagnetic units in another to-be-regulated electromagnetic unit set according to the embodiment of the present disclosure. As shown in FIG. 23, the distribution of electromagnetic units in the to-be-regulated electromagnetic unit set is as follows: electromagnetic units in the middle have small intervals and high density; electromagnetic units at edges have large intervals and low density.

Figure 24:
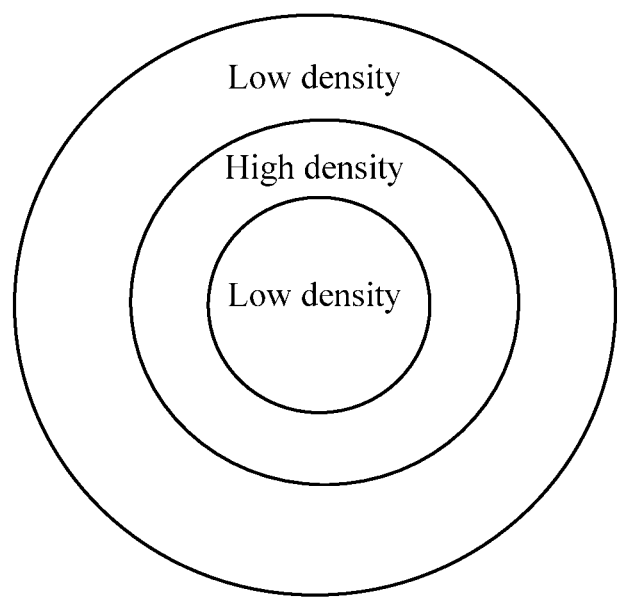
FIG. 24 is a distribution diagram showing an arrangement of electromagnetic units in yet another to-be-regulated electromagnetic unit set according to an embodiment of the present disclosure.

In an embodiment, FIG. 24 is a distribution diagram showing an arrangement of electromagnetic units in yet another to-be-regulated electromagnetic unit set according to an embodiment of the present disclosure. As shown in FIG. 24, the distribution of electromagnetic units in the to-be-regulated electromagnetic unit set is as follows: from the middle to the outer, the density of electromagnetic units becomes larger from smaller and then turns to smaller again. This case is related to a power receiving property of a power reached on the intelligent surface when vortex wave is used for transmitting.

In an embodiment, the grouping an electromagnetic unit set into X electromagnetic unit groups includes: grouping the electromagnetic unit set into the X electromagnetic unit groups according to a second preset condition.

In an embodiment, the second preset condition includes one of or a combination of the following: a preset condition based on a working frequency of wireless communication; a preset condition based on an interval between electromagnetic units; a preset condition based on a total number of electromagnetic units; a preset condition based on a number of electromagnetic units in a horizontal dimension or in a vertical dimension; a preset condition based on a type of an electromagnetic property to be regulated; a preset condition based on regulation precision of an electromagnetic property; a preset condition based on a number of multiplexed transmission layers; a preset condition based on a number of served users; a preset condition based on the distance between an AP or between a UE and an IS; a preset condition based on a usage of an IS; a preset condition based on an MCS; a preset condition based on a type of a communication link; a preset condition based on a type of a channel or a type of a signal; a preset condition based on a transmitting power of an AP or of a UE, pre-coding transmitted by an AP or by a UE, or a beam transmitted by an AP or by a UE.

In an embodiment, electromagnetic unit groups are grouped based on at least one of the following grouping characteristics: electromagnetic units in a same group being in a continuous arrangement or in a discrete arrangement; electromagnetic units in a same group being in a circular arrangement or not; electromagnetic units being grouped into at least one electromagnetic unit group; electromagnetic units being grouped into different electromagnetic unit groups which have same number of electromagnetic units or different number of electromagnetic units.

In an embodiment, different electromagnetic unit groups having different number of electromagnetic units, includes: each electromagnetic unit group on an inner side of an intelligent surface has a fewer number of electromagnetic units than an electromagnetic unit group on an outer side of the intelligent surface.

Figure 25:
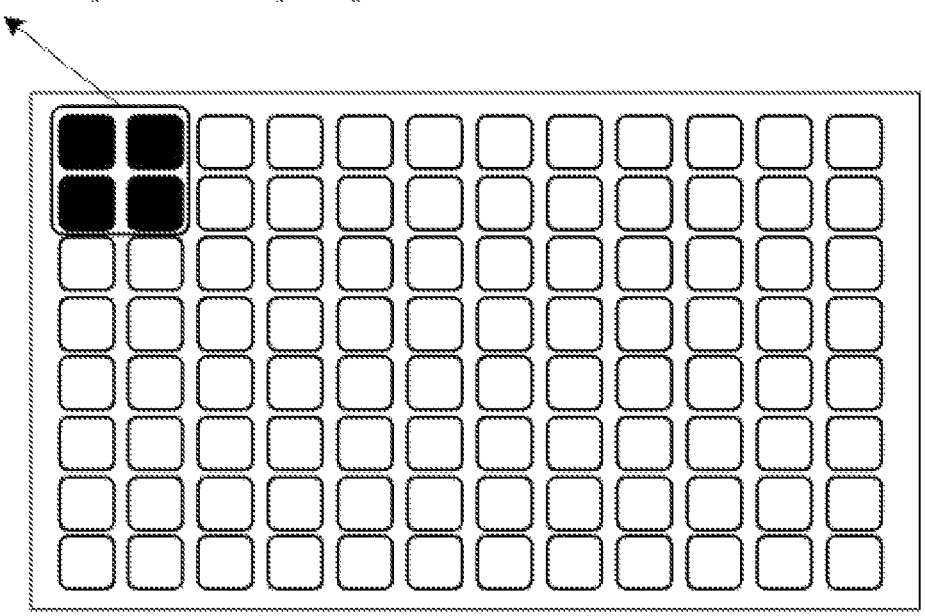
FIG. 25 is a schematic diagram showing a grouping of electromagnetic units in a centralized manner according to an embodiment of the present disclosure.
Figure 26:
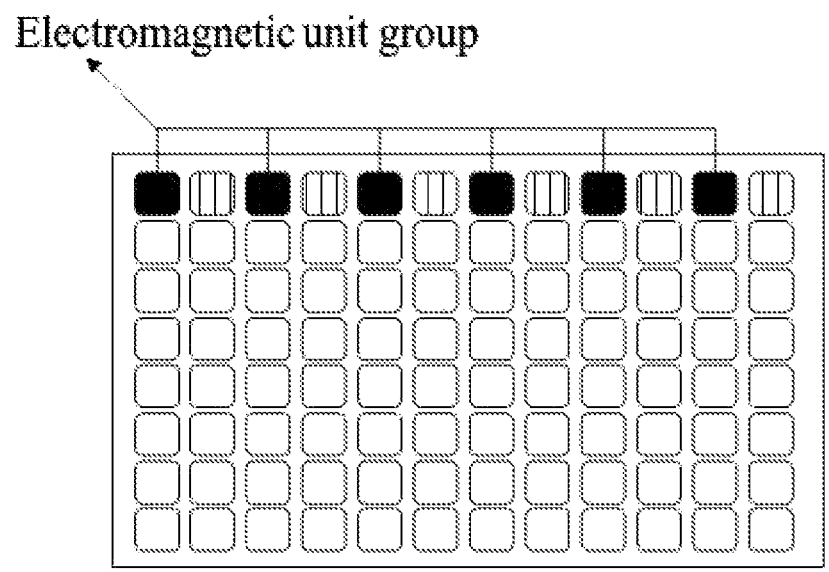
FIG. 26 (1) is a schematic diagram showing a grouping of electromagnetic units in a distributed manner according to an embodiment of the present disclosure.
Figure 26:
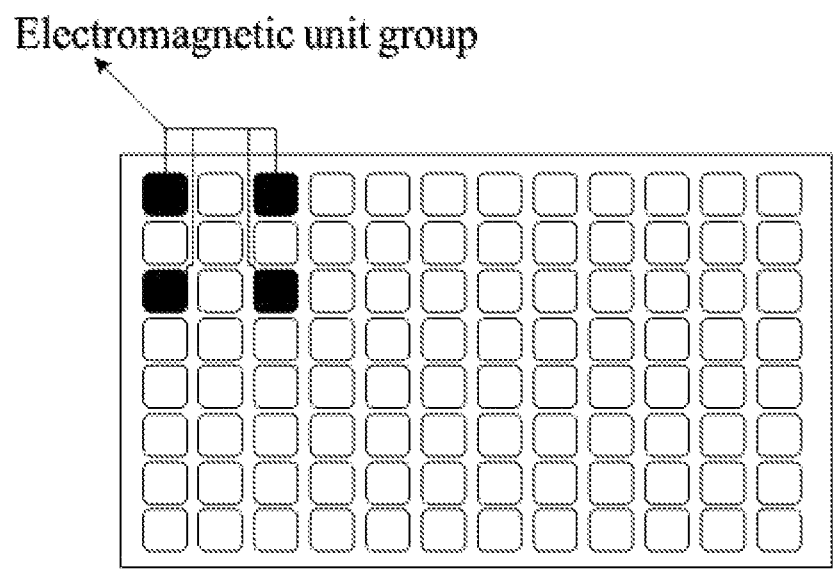

In an implementation, the purpose of grouping electromagnetic units is to regulate the electromagnetic properties by taking the group as a basic unit. All electromagnetic units in the same group are regulated on electromagnetic properties in the same manner or in manners having a strong correlation by using the same set of regulation inputs. In an embodiment, N electromagnetic units correspond to M regulation units, and M≤N. Each electromagnetic unit group includes one or more electromagnetic units. In an embodiment, there are many grouping methods. For example, the simplest grouping method is as follows. N is an integer multiple of M, and the following methods can be used for grouping: grouping electromagnetic units in a centralized manner; and grouping electromagnetic units in a distributed manner. In an embodiment, the grouping is performed on the basis of a consecutive electromagnetic unit arrangement. FIG. 25 is a schematic diagram showing a grouping of electromagnetic units in a centralized manner according to an embodiment of the present disclosure. As shown in FIG. 25, all the electromagnetic units in one electromagnetic unit group are centralized. In an embodiment, the grouping is performed on the basis of a discrete electromagnetic unit arrangement. FIG. 26 (1) is a schematic diagram showing a grouping of electromagnetic units in a distributed manner according to an embodiment of the present disclosure. As shown in FIG. 26 (1), all the electromagnetic units in an electromagnetic unit group are spaced apart, rather than being centralized. FIG. 26 (2) is a schematic diagram showing another grouping of electromagnetic units in a distributed manner according to an embodiment of the present disclosure. As shown in FIG. 26 (2), all the electromagnetic units in an electromagnetic unit group are also spaced apart from each other, rather than being centralized.

Figure 27:
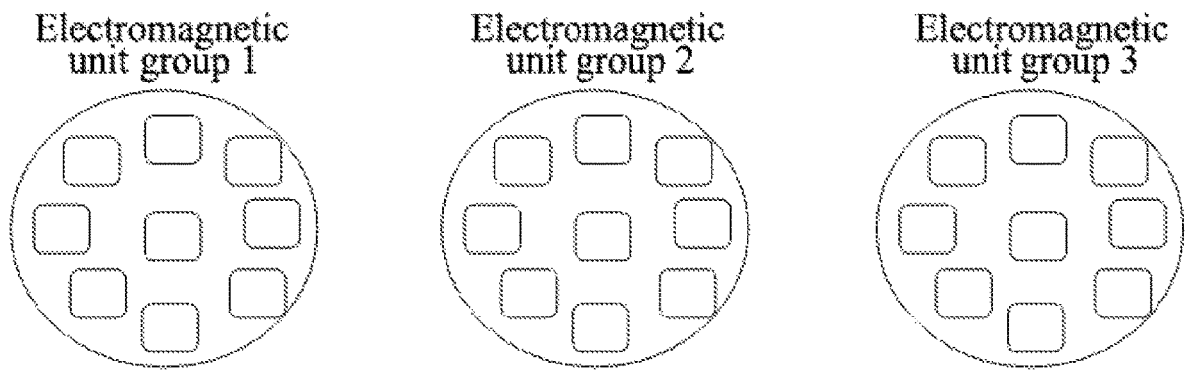
FIG. 27 is a schematic display diagram of an electromagnetic unit group according to an embodiment of the present disclosure.

Exemplarily, for the case where the electromagnetic unit groups are grouped on the basis of a circular arrangement, FIG. 27 is a schematic display diagram of an electromagnetic unit group according to an embodiment of the present disclosure, and as shown in FIG. 27, after the electromagnetic units are grouped, three electromagnetic unit groups can be obtained, and the numbers of electromagnetic units respectively included in the three electromagnetic unit groups are the same. In an embodiment, the numbers of electromagnetic units respectively included in the electromagnetic unit groups may be different.

In an embodiment, the electromagnetic units may be grouped according to the second preset condition to obtain electromagnetic unit groups. In an embodiment, the second preset condition includes one of or a combination of the following: a preset condition based on a working frequency of wireless communication; a preset condition based on an interval between electromagnetic units; a preset condition based on a total number of electromagnetic units; a preset condition based on a number of electromagnetic units in a horizontal dimension or in a vertical dimension; a preset condition based on a type of an electromagnetic property to be regulated; a preset condition based on regulation precision of an electromagnetic property; a preset condition based on a number of multiplexed transmission layers; a preset condition based on a number of served users; a preset condition based on the distance between an AP or between a UE and an IS; a preset condition based on a usage of an IS; a preset condition based on an MCS; a preset condition based on a type of communication link; a preset condition based on a type of a channel or of a signal; a preset condition based on a transmitting power of an AP or of a UE, a preset condition based on pre-coding transmitted by an AP or by an UE or a beam transmitted by an AP or by an UE, and etc.

In the embodiments, different grouping methods described in the above embodiments may be adopted in cases of different working frequencies of wireless communication; different grouping methods described in the above embodiments may be adopted in cases of different electromagnetic unit intervals; different grouping methods described in the above embodiments may be adopted in cases of different numbers of electromagnetic units; different grouping methods described in the above embodiments may be adopted in cases of different types of electromagnetic properties to be regulated; different grouping methods described in the above embodiments may be adopted in cases of different regulation precisions of electromagnetic properties; different grouping methods described in the above embodiments may be adopted in cases of different numbers of transmission layers; different grouping methods described in the above embodiments may be adopted in cases of different numbers of served users; different grouping methods described in the above embodiments may be adopted in cases of different distances between an IS and APs; different grouping methods described in the above embodiments may be adopted in cases of different distances between an IS and UEs; different grouping methods described in the above embodiments may be adopted in cases of different usages of an IS; different grouping methods described in the above embodiments may be adopted in cases of different MCSs; different grouping methods described in the above embodiments may be adopted in cases of different types of links; different grouping methods described in the above embodiments may be adopted in cases of different types of channels or of signals.

Figure 28:
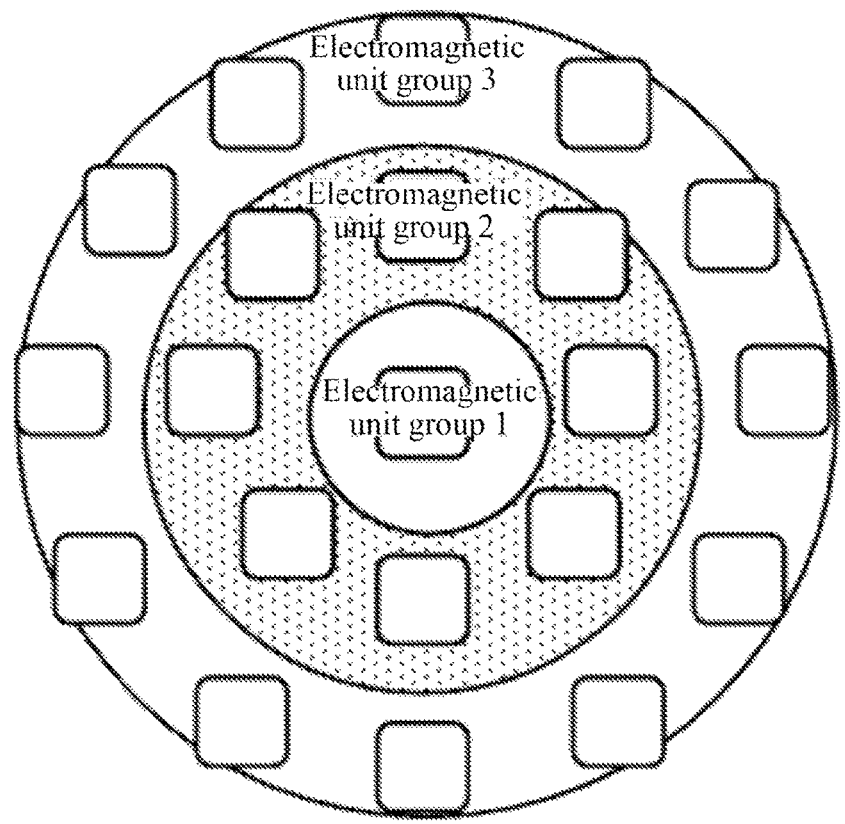
FIG. 28 (1) is a schematic diagram showing a grouping of all electromagnetic units in a to-be-regulated electromagnetic unit set according to an embodiment of the present disclosure.
Figure 28:
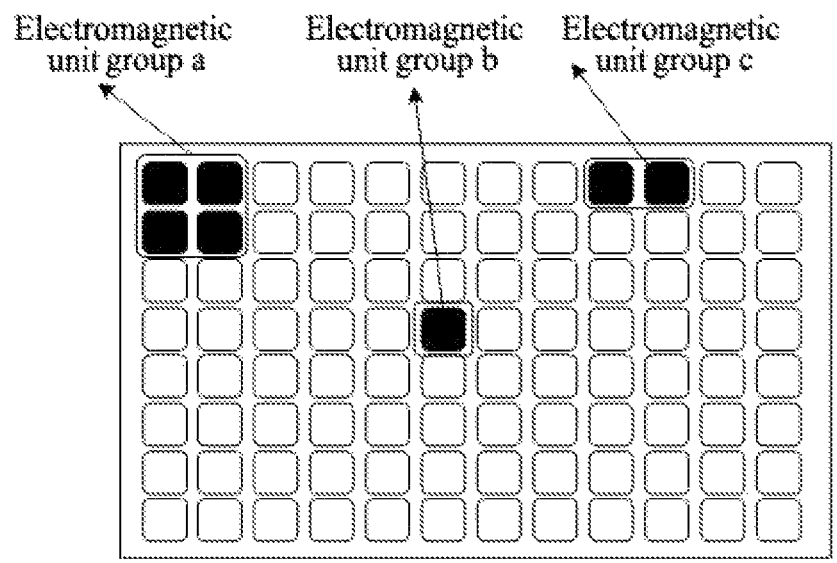

In an embodiment, different grouping methods are used to group all electromagnetic units in the to-be-regulated electromagnetic unit set. That is, the numbers of, densities of, or, distributions of electromagnetic units included in the multiple electromagnetic unit groups are different. In an embodiment, the numbers of electromagnetic units included in multiple electromagnetic unit groups are different, and the number of electromagnetic units included in an electromagnetic unit group on an inner side of the intelligent surface is less than the number of electromagnetic units included in an electromagnetic unit group on an outer side of the intelligent surface. FIG. 28 (1) is a schematic diagram showing a grouping of all electromagnetic units in a to-be-regulated electromagnetic unit set according to an embodiment of the present disclosure, and FIG. 28 (2) is schematic diagram showing another grouping of all electromagnetic units in a to-be-regulated electromagnetic unit set according to another embodiment of the present disclosure. As shown in FIG. 28 (1) and FIG. 28 (2), where it is farther from the center, the granularity of an electromagnetic unit group is larger, and the number of electromagnetic units included in the electromagnetic unit group is larger. As shown in FIG. 28 (1), the numbers of electromagnetic units respectively included in an electromagnetic unit group 1, an electromagnetic unit group 2 and an electromagnetic unit group 3 increase in sequence; and as shown in FIG. 28 (2), the numbers of electromagnetic units respectively included in an electromagnetic unit group b, an electromagnetic unit group c and an electromagnetic unit group a increase in sequence.

In an embodiment, a condition for determining the electromagnetic property set include at least one of the following: a working frequency of wireless communication, a number of multiplexed transmission layers, a number of users, a distance between an AP or between a UE and an IS; a receiving power; a usage of an IS; an MCS; regulation granularity of electromagnetic properties; a type of a communication link; a type of a channel or of a signal; a target user or a target AP.

In an implementation, electromagnetic properties can include various types, for example, the electromagnetic properties that can be regulated and changed in theory include: a phase, an amplitude, a frequency, a polarization, an angular momentum (which can be further divided into orbital angular momentum (OAM), spin angular momentum (SAM)), and etc.

In an embodiment, different electromagnetic property sets to be regulated may be pre-agreed or determined according to the following conditions. In an embodiment, the condition for determining the electromagnetic property set includes at least one of the following: a preset condition based on a working frequency of wireless communication; a preset condition based on a number of multiplexed transmission layers; a preset condition based on a number of users; a preset condition based on a distance between an AP or between a UE and an intelligent surface; a preset condition based on a receiving power; a preset condition based on a usage of an intelligent surface; a preset condition based on an MCS; a preset condition based on regulation granularity of an electromagnetic property; a preset condition based on a type of a communication link; a preset condition based on a type of a channel or a type of a signal; a preset condition based on a target user or based on a target AP; a preset condition based on a transmitting power of an AP or of a UE, a preset condition based on pre-coding transmitted by an AP or by a UE or a beam transmitted by an AP or by a UE.

In an embodiment, an electromagnetic property set to be regulated is determined according to a working frequency of wireless communication. Since the working frequency of wireless communication affects the difficulty of regulation, regulation of multiple electromagnetic properties may be easily implemented for some frequencies, while regulation of only one electromagnetic property is suitable to be implemented for other frequencies.

In an embodiment, an electromagnetic property set to be regulated is determined according to the number of multiplexed transmission layers. In an embodiment, when more transmission layers are multiplexed, the number of electromagnetic properties in the electromagnetic property set to be regulated is larger. It may regulate only phase in a case of single transmission layer, but in a case of multiple transmission layer multiplexing, it is required to regulate more electromagnetic properties, such as regulating phase and amplitude, regulating phase, amplitude and frequency, regulating phase, amplitude and angular momentum, and etc.

In an embodiment, an electromagnetic property set to be regulated is determined according to the number of multiplexed users. In an embodiment, when more users are multiplexed, the number of electromagnetic properties in the electromagnetic property set to be regulated is larger. It may regulate only phase in a case of transmission for a single user, but in a case of transmission for multiple users, it is required to regulate more electromagnetic properties, such as regulating phase and amplitude, regulating phase, amplitude and frequency, regulating phase, amplitude, and angular momentum, and etc.

In an embodiment, an electromagnetic property set to be regulated is determined according to a distance between an AP or between a UE and an IS. In an embodiment, when the distance between an AP or UE and an IS is shorter, the number of electromagnetic properties in the electromagnetic property set to be regulated is larger, it may regulate only phase in a case of a large distance, but in a case of a small distance, it is required to regulate more electromagnetic properties, such as regulating phase and amplitude, regulating phase, amplitude and frequency, regulating phase, amplitude, and angular momentum, and etc.

In an embodiment, an electromagnetic property set to be regulated is determined according to a receiving power on the intelligent surface. In an embodiment, when the receiving power of one electromagnetic unit or of multiple electromagnetic units on the intelligent surface is greater, types of electromagnetic properties required to be regulated are more.

In an embodiment, an electromagnetic property set to be regulated is determined according to a usage of an IS. In an embodiment, in a case of active transmitting, more types of electromagnetic properties are required to be regulated, and in cases of passive reflection or transmission, less types of electromagnetic properties are required to be regulated.

In an embodiment, an electromagnetic property set to be regulated is determined according to an MCS. In an embodiment, when the order of the MCS is higher, more types of electromagnetic properties are required to be regulated; and when the order of the MCS is lower, fewer types of electromagnetic properties are required to be regulated.

In an embodiment, an electromagnetic property set to be regulated is determined according to a regulation granularity of an electromagnetic property. In an embodiment, in order to control the overall complexity, for different regulation granularities, different types of electromagnetic properties are required to be regulated.

In an embodiment, an electromagnetic property set to be regulated is determined according to a type of communication link. In an embodiment, for different types of communication links, different types of electromagnetic properties are required to be regulated.

In an embodiment, an electromagnetic property set to be regulated is determined according to a type of a channel or of a signal. In an embodiment, for different types of channels or of signals, different types of electromagnetic properties are required to be regulated.

In an embodiment, an electromagnetic property set to be regulated is determined according to a target user or a target AP. In an embodiment, for different target users or APs, different types of electromagnetic properties are required to be regulated.

Figure 29:
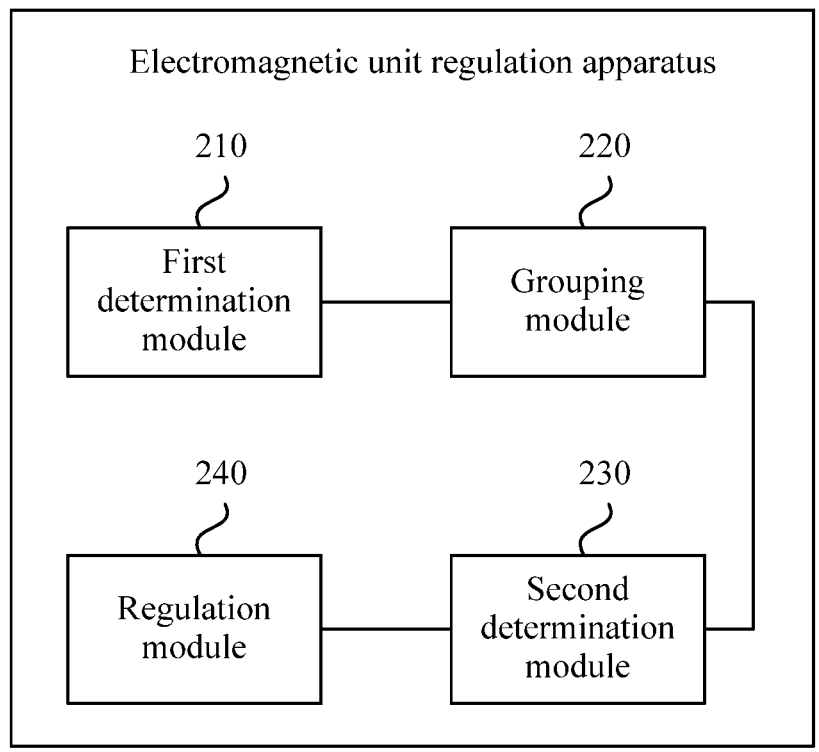
FIG. 29 is a structural block diagram of an electromagnetic unit regulation apparatus according to an embodiment of the present disclosure.

FIG. 29 is a structural block diagram of an electromagnetic unit regulation apparatus according to an embodiment of the present disclosure. As shown in FIG. 29, the electromagnetic unit regulation apparatus in this embodiment includes: a first determination module 210, a grouping module 220, a second determination module 230 and a regulation module 240.

The first determination module 210 is configured to determine a to-be-regulated electromagnetic unit set S2, where the to-be-regulated electromagnetic unit set S2 is a subset of a regulatable electromagnetic unit set S1; the grouping module 220 is configured to group an electromagnetic unit set into X electromagnetic unit groups, where $X \geq 1$, the electromagnetic unit set includes at least one of the to-be-regulated electromagnetic unit set S2 and the regulatable electromagnetic unit set S1; the second determination module 230 is configured to determine an electromagnetic property set to be regulated; the regulation module 240 is configured to, according to the X electromagnetic unit groups, perform regulation on an electromagnetic property of the to-be-regulated electromagnetic unit set S2, and the electromagnetic property is at least one electromagnetic property in the electromagnetic property set.

The electromagnetic unit regulation apparatus according to this embodiment is configured to implement the electromagnetic unit regulation method according to the embodiment shown in FIG. 4, the principle of implementation and technical effects of the electromagnetic unit regulation apparatus are similar to those of the electromagnetic unit regulation method, which are not repeatedly described herein.

In an embodiment, the first determination module is configured to: determine the to-be-regulated electromagnetic unit set according to a first preset condition; or, determine that the to-be-regulated electromagnetic unit set S2 is equal to the regulatable electromagnetic unit set S1.

In an embodiment, the grouping module is configured to: group the electromagnetic unit set into the X electromagnetic unit groups according to a second preset condition.

In an embodiment, the first preset condition includes one of or a combination of the following: a preset condition based on a working frequency of wireless communication; a preset condition based on a receiving power of an intelligent surface; a preset condition based on a type of a channel or a type of a signal; a preset condition based on the locations or number of target users of downlink transmission; a preset condition based on the locations or number of target access points of uplink transmission; a preset condition based on a type of a communication link; a preset condition based on content of control signaling sent by an AP or by a UE; a preset condition based on a type of an electromagnetic property to be regulated; a preset condition based on regulation precision of an electromagnetic property; a preset condition based on regulation granularity of an electromagnetic property; a preset condition based on an MCS; a preset condition based on a dielectric coefficient, electric conductivity or magnetic permeability; a preset condition based on a usage of an intelligent surface (IS); a preset condition based on a number of multiplexed transmission layers; a preset condition based on antenna configuration of a transmitting end or of a receiving end; a preset condition based on a transmitting power of an AP or of a UE, a preset condition based on pre-coding transmitted by an AP or by a UE or a beam transmitted by an AP or by a UE.

In an embodiment, the second preset condition includes one of or a combination of the following: a preset condition based on a working frequency of wireless communication; a preset condition based on an interval between electromagnetic units; a preset condition based on a total number of electromagnetic units; a preset condition based on a number of electromagnetic units in a horizontal or vertical dimension; a preset condition based on a type of an electromagnetic property to be regulated; a preset condition based on regulation precision of an electromagnetic property to be regulated; a preset condition based on a number of multiplexed transmission layers; a preset condition based on a number of served users; a preset condition based on a distance between an AP or between a UE and an IS; a preset condition based on a usage of an IS; a preset condition based on an MCS; a preset condition based on a type of a communication link; a preset condition based on a type of a channel or a type of a signal; a preset condition based on a transmitting power of an AP or of a UE, a preset condition based on pre-coding transmitted by an AP or by an UE or a beam transmitted by an AP or by an UE.

In an embodiment, the working frequency of wireless communication includes: a working frequency of transmitting, a working frequency of reflection, or a working frequency of transmission; the working frequency of wireless communication is proportional to a number of electromagnetic units included in the to-be-regulated electromagnetic unit set.

In an embodiment, in a case where the first preset condition is the preset condition based on the receiving power of the intelligent surface, the first determination module is configured to:

determine a comparison result between a receiving power on a single electromagnetic unit or multiple electromagnetic units in the intelligent surface and a pre-configured power threshold value; and in a case where the comparison result is that a receiving power of a single electromagnetic unit or of multiple electromagnetic units is greater than or equal to the power threshold value, add the single electromagnetic unit or the multiple electromagnetic units to the to-be-regulated electromagnetic unit set.

In an embodiment, the power threshold value is determined in one of the following manners: the power threshold value is a fixed value; the power threshold value is configured by a base station; the power threshold value is configured by a UE; or, the power threshold value is implicitly determined according to a target parameter. The target parameter includes one or more of the following: a working frequency of wireless communication, a dielectric coefficient, electric conductivity, magnetic permeability, a number of electromagnetic units, a number of multiplexed transmission layers, a type of an electromagnetic property to be regulated, a usage of an IS, MCS, a type of a communication link, a type of a channel or of a signal, a transmitting power of an AP or of a UE, pre-coding transmitted by an AP or by a UE or a beam transmitted by an AP or by a UE.

In an embodiment, the type of the channel or of the signal includes one of the following: a public control channel, a broadcast channel, a data channel, a synchronization signal, or a pilot signal.

In an embodiment, a number of electromagnetic units included in the to-be-regulated electromagnetic unit set in a case where the type of the channel or of the signal is a public control channel, a broadcast channel or a synchronization signal is greater than a number of electromagnetic units included in the to-be-regulated electromagnetic unit set in a case where the type of the channel or of the signal is a data channel or a pilot signal.

In an embodiment, the pilot signal includes: a measurement pilot and a demodulation pilot; and a number of electromagnetic units contained in a to-be-regulated electromagnetic unit set corresponding to the measurement pilot is greater than a number of electromagnetic units contained in a to-be-regulated electromagnetic unit set corresponding to the demodulation pilot.

In an embodiment, in a case where the first preset condition is the preset condition based on the target user of downlink transmission, the first determination module is configured to:
  determine the to-be-regulated electromagnetic unit set according to a location of a target user of downlink transmission; or, determine the to-be-regulated electromagnetic unit set according to a number of target users of downlink transmission; or, determine the to-be-regulated electromagnetic unit set according to an ID of a target user of downlink transmission.

In an embodiment, in a case where the first preset condition is the preset condition based on the target access point of uplink transmission, the first determination module is configured to:
  determine the to-be-regulated electromagnetic unit set according to a location of a target access point of uplink transmission; or determine the to-be-regulated electromagnetic unit set according to a number of target access points of uplink transmission; or determine the to-be-regulated electromagnetic unit set according to an ID of a target access point of uplink transmission.

In an embodiment, electromagnetic unit groups are grouped based on at least one of the following grouping characteristics: electromagnetic units in a same group being in a continuous arrangement or in a discrete arrangement; electromagnetic units in a same group being in a circular arrangement or not; electromagnetic units being grouped into at least one electromagnetic unit group; electromagnetic units being grouped into different electromagnetic unit groups which have same number of electromagnetic units or different number of electromagnetic units.

In an embodiment, different electromagnetic unit groups having different number of electromagnetic units includes: each electromagnetic unit group on an inner side of an intelligent surface has a fewer number of electromagnetic units than an electromagnetic unit group on an outer side of the intelligent surface.

In an embodiment, the type of the communication link includes one of the following: a downlink from an AP to a UE; an uplink from a UE to an AP; a sidelink from a UE to a UE; a backhaul link from an AP to an AP.

In an embodiment, an order of a modulation and decoding scheme is proportional to a number of electromagnetic units included in a to-be-regulated electromagnetic unit set.

In an embodiment, the dielectric coefficient is inversely proportional to a number of electromagnetic units included in a to-be-regulated electromagnetic unit set.

In an embodiment, a property of a to-be-regulated electromagnetic unit set includes at least one of the following: electromagnetic units being arranged in a rectangular arrangement, in a circular arrangement or in an annular arrangement; a number of electromagnetic units in a horizontal dimension being greater than a number of electromagnetic units in a vertical dimension; a distribution density of electromagnetic units being dense on an inner side and being sparse on an outer side; electromagnetic units being of one or more of multiple intelligent surfaces; electromagnetic units being multiple electromagnetic unit elements on each intelligent surface; electromagnetic units being discretely interleaved; electromagnetic units being arranged in a solid or hollow rectangle; electromagnetic units being arranged in a solid or hollow rhombus; or, electromagnetic units being arranged in a solid or hollow circle.

In an embodiment, the distribution density of electromagnetic units being uneven, includes one of the following: a distribution density of electromagnetic units on an inner side of an intelligent surface being greater than or equal to a distribution density of electromagnetic units on an outer side of a same intelligent surface; a distribution density of electromagnetic units on a left side of an intelligent surface is greater than or equal to a distribution density of electromagnetic units on a right side of a same intelligent surface; a distribution density of electromagnetic units on a right side of an intelligent surface being greater than or equal to a distribution density of electromagnetic units on a left side of a same intelligent surface; a distribution density of electromagnetic units on an upper side of an intelligent surface being greater than or equal to a distribution density of electromagnetic units on a lower side of a same intelligent surface; and a distribution density of electromagnetic units on a lower side of an intelligent surface being greater than or equal to a distribution density of electromagnetic units on an upper side of a same intelligent surface.

In an embodiment, a condition for determining the electromagnetic property set includes at least one of the following: a preset condition based on a working frequency of wireless communication; a preset condition based on a number of multiplexed transmission layers; a preset condition based on a number of users; a preset condition based on a distance between an AP or between a UE and an intelligent surface; a preset condition based on a receiving power; a preset condition based on a usage of an intelligent surface;

a preset condition based on an MCS; a preset condition based on regulation granularity of an electromagnetic property; a preset condition based on a type of a communication link; a preset condition based on a type of a channel or a type of a signal; a preset condition based on a target user or based on a target AP; a preset condition based on a transmitting power of an AP or of a UE, a preset condition based on pre-coding transmitted by an AP or by a UE or a beam transmitted by an AP or by a UE.

Figure 30:
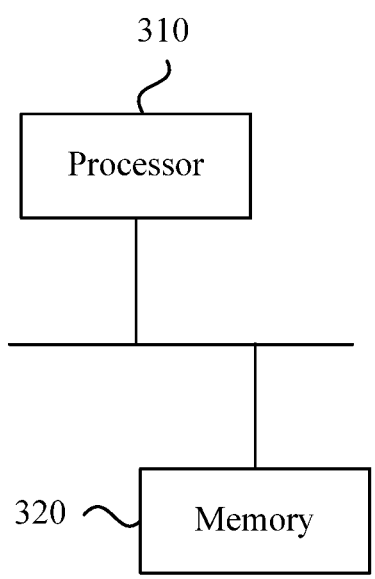
FIG. 30 is a schematic structural diagram of a device according to an embodiment of the present disclosure.

FIG. 30 is a schematic structural diagram of a device according to an embodiment of the present disclosure. As shown in FIG. 30, the device according to the present disclosure includes a processor 310 and a memory 320. The device may include one or more processors 310, and one processor 310 included is taken as an example in FIG. 30. The device may include one or more memories, and one memory 320 included is taken as an example in FIG. 30. The processor 310 and the memory 320 in the device may be connected via a bus or via other means, and connection via a bus is taken as an example in FIG. 30. In this embodiment, the device may be an intelligent surface.

As a computer-readable storage medium, the memory 320 may be configured to store a software program, a computer-executable program and a module, such as the program instructions/module corresponding to the device according to any embodiment of the present disclosure (e.g., the first determination module, the grouping module and the second determination module and the regulation module in the electromagnetic unit regulation apparatus). The memory 320 may include a program storage area and a data storage area, where the program storage area may store an operating system and at least one application program required by functions, the data storage area may store data created during a utilization of the device, and etc. furthermore, the memory 320 may include a high-speed random access memory, and may further include a non-volatile memory, such as at least one magnetic disk storage apparatus, a flash memory device, or other non-volatile solid-state storage apparatus. In some examples, the memory 320 may include memories which are remotely provided with respect to the processor(s) 310, and these remote memories may be connected to the device through a network. Examples of the aforementioned network include, but are not limited to, the Internet, an intranet, a local area network, a mobile communication network, or any combination thereof.

The device provided as described above can be configured to execute the electromagnetic unit regulation method according to any of the above embodiments, and has functions and effects corresponding to the method.

A storage medium containing computer-executable instructions is further provided according to the embodiments of the present disclosure, where the computer-executable instructions are used to execute an electromagnetic unit regulation method when the instructions are executed by a computer processor. The electromagnetic unit regulation method includes: determining a to-be-regulated electromagnetic unit set S2, where the to-be-regulated electromagnetic unit set S2 is a subset of a regulatable electromagnetic unit set S1; grouping an electromagnetic unit set into X electromagnetic unit groups, where X≥1, and the electromagnetic unit set includes at least one of the to-be-regulated electromagnetic unit set S2 and the regulatable electromagnetic unit set S1; determining an electromagnetic property set to be regulated; and according to the X electromagnetic unit groups, performing regulation on an electromagnetic property of the to-be-regulated electromagnetic unit set S2, where the electromagnetic property is at least one electromagnetic property in the electromagnetic property set.

The term "user equipment" encompasses any appropriate type of radio user device, such as a mobile phone, a portable data processing apparatus, a portable web browser, or a vehicle-mounted mobile station.

Generally speaking, the various the embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile device executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. An electromagnetic unit regulation method, comprising:
   determining a to-be-regulated electromagnetic unit set S2, wherein the to-be-regulated electromagnetic unit set S2 is a subset of a regulatable electromagnetic unit set S1;
   grouping an electromagnetic unit set into X electromagnetic unit groups, wherein X≥1, and the electromagnetic unit set comprises the to-be-regulated electromagnetic unit set S2;
   determining an electromagnetic property set to be regulated; and
   according to the X electromagnetic unit groups, performing regulation on an electromagnetic property of the to-be-regulated electromagnetic unit set S2, wherein the electromagnetic property is at least one electromagnetic property in the electromagnetic property set;
   wherein the determining an electromagnetic property set S2 to be regulated comprises:
   determining the to-be-regulated electromagnetic unit set S2 according to a first preset condition; or, determining that the to-be-regulated electromagnetic unit set S2 is equal to the regulatable electromagnetic unit set S1.

2. The electromagnetic unit regulation method according to claim 1, wherein the grouping an electromagnetic unit set into X electromagnetic unit groups, comprises:
grouping the electromagnetic unit set into the X electromagnetic unit groups according to a second preset condition.

3. The electromagnetic unit regulation method according to claim 1, wherein the first preset condition comprises one of or a combination of the following: a preset condition based on a working frequency of wireless communication; a preset condition based on a receiving power of an intelligent surface; a preset condition based on a type of a channel or a type of a signal; a preset condition based on a target user of downlink transmission; a preset condition based on a target access point of uplink transmission; a preset condition based on a type of a communication link; a preset condition based on content of control signaling sent by an access point (AP) or sent by a user equipment (UE); a preset condition based on a type of an electromagnetic property to be regulated; a preset condition based on regulation precision of an electromagnetic property; a preset condition based on regulation granularity of an electromagnetic property; a preset condition based on a modulation and coding scheme (MCS); a preset condition based on a dielectric coefficient, electric conductivity or magnetic permeability; a preset condition based on a usage of an intelligent surface; a preset condition based on a number of multiplexed transmission layers; a preset condition based on antenna configuration of a transmitting end or of a receiving end; a preset condition based on a transmitting power of an AP or of a UE, a preset condition based on pre-coding transmitted by an AP or by an UE or a beam transmitted by an AP or by an UE.

4. The electromagnetic unit regulation method according to claim 2, wherein the second preset condition comprises one of or a combination of the following: a preset condition based on a working frequency of wireless communication; a preset condition based on an interval between electromagnetic units; a preset condition based on a total number of electromagnetic units; a preset condition based on a number of electromagnetic units in a horizontal dimension or in a vertical dimension; a preset condition based on a type of an electromagnetic property to be regulated; a preset condition based on regulation precision of an electromagnetic property; a preset condition based on a number of multiplexed transmission layers; a preset condition based on a number of served users; a preset condition based on a distance between an AP or between a UE and an intelligent surface; a preset condition based on a usage of an intelligent surface; a preset condition based on an MCS; a preset condition based on a type of a communication link; a preset condition based on a type of a channel or a type of a signal; a preset condition based on a transmitting power of an AP or of a UE, a preset condition based on pre-coding transmitted by an AP or by an UE or a beam transmitted by an AP or by an UE.

5. The electromagnetic unit regulation method according to claim 3, wherein the working frequency of wireless communication comprises: a working frequency of transmitting, a working frequency of reflection, or a working frequency of transmission; and
the working frequency of wireless communication is proportional to a number of electromagnetic units comprised in the to-be-regulated electromagnetic unit set S2.

6. The electromagnetic unit regulation method according to claim 3, wherein, in a case where the first preset condition is the preset condition based on the receiving power of the intelligent surface, the determining the to-be-regulated electromagnetic unit set S2 according to a first preset condition comprises:
determining a comparison result between a receiving power of a single electromagnetic unit or of a plurality of electromagnetic units in the intelligent surface and a pre-configured power threshold value; and
in a case where the comparison result is that the receiving power of the single electromagnetic unit or of the plurality of electromagnetic units is greater than or equal to the power threshold value, adding the single electromagnetic unit or the plurality of electromagnetic units to the to-be-regulated electromagnetic unit set S2.

7. The electromagnetic unit regulation method according to claim 6, wherein the power threshold value is determined in one of the following manners: the power threshold value is a fixed value, the power threshold value is configured by a base station, the power threshold value is configured by a UE, or the power threshold value is implicitly determined according to a target parameter; wherein the target parameter comprises at least one of the following: a working frequency of wireless communication, a dielectric coefficient, electric conductivity, magnetic permeability, a number of electromagnetic units, a number of multiplexed transmission layers, a type of an electromagnetic property to be regulated, a usage of an intelligent surface, MCS, a type of a communication link, a type of a channel or of a signal, a transmitting power of an AP or of a UE, pre-coding transmitted by an AP or by a UE or a beam transmitted by an AP or by a UE.

8. The electromagnetic unit regulation method according to claim 3, wherein the type of the channel or of the signal comprises one of the following: a public control channel, a broadcast channel, a data channel, a synchronization signal, or a pilot signal.

9. The electromagnetic unit regulation method according to claim 3, wherein, in a case where the first preset condition is the preset condition based on the target user of downlink transmission, the determining the to-be-regulated electromagnetic unit set S2 according to a first preset condition comprises:
determining the to-be-regulated electromagnetic unit set S2 according to a location of a target user of downlink transmission; or,
determining the to-be-regulated electromagnetic unit set S2 according to a number of target users of downlink transmission; or,
determining the to-be-regulated electromagnetic unit set S2 according to an identifier (ID) of a target user of downlink transmission.

10. The electromagnetic unit regulation method according to claim 3, wherein, in a case where the first preset condition is the preset condition based on the target access point of uplink transmission, the determining the to-be-regulated electromagnetic unit set S2 according to a first preset condition comprises:
determining the to-be-regulated electromagnetic unit set S2 according to a location of a target access point of uplink transmission; or
determining the to-be-regulated electromagnetic unit set S2 according to a number of target access points of uplink transmission; or
determining the to-be-regulated electromagnetic unit set S2 according to an ID of a target access point of uplink transmission.

11. The electromagnetic unit regulation method according to claim 2, wherein electromagnetic unit groups are grouped based on at least one of the following grouping characteristics: electromagnetic units in a same group being in a continuous arrangement or in a discrete arrangement; electromagnetic units in a same group being in a circular arrangement or not; electromagnetic units being grouped into at least one electromagnetic unit group; electromagnetic units being grouped into different electromagnetic unit groups which have same number of electromagnetic units or different number of electromagnetic units.

12. The electromagnetic unit regulation method according to claim 11, wherein different electromagnetic unit groups having different number of electromagnetic units, comprises:
   each electromagnetic unit group on an inner side of an intelligent surface has a fewer number of electromagnetic units than an electromagnetic unit group on an outer side of the intelligent surface.

13. The electromagnetic unit regulation method according to claim 3, wherein a property of the to-be-regulated electromagnetic unit set S2 comprises at least one of the following: electromagnetic units being arranged in a rectangular arrangement, in a circular arrangement or in an annular arrangement; a number of electromagnetic units in a horizontal dimension being greater than a number of electromagnetic units in a vertical dimension; a distribution density of the electromagnetic units being uneven; electromagnetic units being of at least one of a plurality of intelligent surfaces; electromagnetic units being a plurality of electromagnetic unit elements on each intelligent surface; electromagnetic units being discretely interleaved; electromagnetic units being arranged in a solid or hollow rectangle; electromagnetic units being arranged in a solid or hollow rhombus; electromagnetic units being arranged in a solid or hollow circle.

14. The electromagnetic unit regulation method according to claim 13, wherein the distribution density of electromagnetic units being uneven, comprises one of the following: a distribution density of electromagnetic units on an inner side of an intelligent surface being greater than or equal to a distribution density of electromagnetic units on an outer side of a same intelligent surface; a distribution density of electromagnetic units on a left side of an intelligent surface being greater than or equal to a distribution density of electromagnetic units on a right side of a same intelligent surface; a distribution density of electromagnetic units on a right side of an intelligent surface being greater than or equal to a distribution density of electromagnetic units on a left side of a same intelligent surface; a distribution density of electromagnetic units on an upper side of an intelligent surface being greater than or equal to a distribution density of electromagnetic units on a lower side of a same intelligent surface; and a distribution density of electromagnetic units on a lower side of an intelligent surface being greater than or equal to a distribution density of electromagnetic units on a upper side of a same intelligent surface.

15. The electromagnetic unit regulation method according to claim 1, wherein a condition for determining the electromagnetic property set comprises at least one of the following: a preset condition based on a working frequency of wireless communication; a preset condition based on a number of multiplexed transmission layers; a preset condition based on a number of users; a preset condition based on a distance between an AP and a UE and an intelligent surface; a preset condition based on a receiving power; a preset condition based on a usage of an intelligent surface; a preset condition based on an MCS; a preset condition based on regulation granularity of an electromagnetic property; a preset condition based on a type of a communication link; a preset condition based on a type of a channel or a type of a signal; a preset condition based on a target user or based on a target AP; a preset condition based on a transmitting power of an AP or of a UE, a preset condition based on pre-coding transmitted by an AP or by a UE or a beam transmitted by an AP or by a UE.

16. A device, comprising: a memory, and at least one processor;
   wherein the memory is configured to store at least one program; and
   the at least one program, when being executed by the at least one processor, causes the at least one processor to implement:
   determining a to-be-regulated electromagnetic unit set S2, wherein the to-be-regulated electromagnetic unit set S2 is a subset of a regulatable electromagnetic unit set S1;
   grouping an electromagnetic unit set into X electromagnetic unit groups, wherein X≥1, and the electromagnetic unit set comprises the to-be-regulated electromagnetic unit set S2;
   determining an electromagnetic property set to be regulated; and
   according to the X electromagnetic unit groups, performing regulation on an electromagnetic property of the to-be-regulated electromagnetic unit set S2, wherein the electromagnetic property is at least one electromagnetic property in the electromagnetic property set;
   wherein the determining an electromagnetic property set S2 to be regulated comprises:
   determining the to-be-regulated electromagnetic unit set S2 according to a first preset condition; or,
   determining that the to-be-regulated electromagnetic unit set S2 is equal to the regulatable electromagnetic unit set S1.

17. A non-transitory computer readable storage medium storing a computer program, wherein the computer program, when being executed by a processor, implements:
   determining a to-be-regulated electromagnetic unit set S2, wherein the to-be-regulated electromagnetic unit set S2 is a subset of a regulatable electromagnetic unit set S1;
   grouping an electromagnetic unit set into X electromagnetic unit groups, wherein X≥1, and the electromagnetic unit set comprises the to-be-regulated electromagnetic unit set S2;
   determining an electromagnetic property set to be regulated; and
   according to the X electromagnetic unit groups, performing regulation on an electromagnetic property of the to-be-regulated electromagnetic unit set S2, wherein the electromagnetic property is at least one electromagnetic property in the electromagnetic property set;
   wherein the determining an electromagnetic property set S2 to be regulated comprises:
   determining the to-be-regulated electromagnetic unit set S2 according to a first preset condition; or,
   determining that the to-be-regulated electromagnetic unit set S2 is equal to the regulatable electromagnetic unit set S1.

18. The device according to claim 16, wherein the grouping an electromagnetic unit set into X electromagnetic unit groups, comprises:
   grouping the electromagnetic unit set into the X electromagnetic unit groups according to a second preset condition.

19. The device according to claim 16, wherein the grouping an electromagnetic unit set into X electromagnetic unit groups, comprises:

wherein the first preset condition comprises one of or a combination of the following: a preset condition based on a working frequency of wireless communication; a preset condition based on a receiving power of an intelligent surface; a preset condition based on a type of a channel or a type of a signal; a preset condition based on a target user of downlink transmission; a preset condition based on a target access point of uplink transmission; a preset condition based on a type of a communication link; a preset condition based on content of control signaling sent by an access point (AP) or sent by a user equipment (UE); a preset condition based on a type of an electromagnetic property to be regulated; a preset condition based on regulation precision of an electromagnetic property; a preset condition based on regulation granularity of an electromagnetic property; a preset condition based on a modulation and coding scheme (MCS); a preset condition based on a dielectric coefficient, electric conductivity or magnetic permeability; a preset condition based on a usage of an intelligent surface; a preset condition based on a number of multiplexed transmission layers; a preset condition based on antenna configuration of a transmitting end or of a receiving end; a preset condition based on a transmitting power of an AP or of a UE, a preset condition based on pre-coding transmitted by an AP or by an UE or a beam transmitted by an AP or by an UE.

20. The device according to claim 16, wherein a condition for determining the electromagnetic property set comprises at least one of the following: a preset condition based on a working frequency of wireless communication; a preset condition based on a number of multiplexed transmission layers; a preset condition based on a number of users; a preset condition based on a distance between an AP or between a UE and an intelligent surface; a preset condition based on a receiving power; a preset condition based on a usage of an intelligent surface; a preset condition based on an MCS; a preset condition based on regulation granularity of an electromagnetic property; a preset condition based on a type of a communication link; a preset condition based on a type of a channel or a type of a signal; a preset condition based on a target user or based on a target AP; a preset condition based on a transmitting power of an AP or of a UE, a preset condition based on pre-coding transmitted by an AP or by a UE or a beam transmitted by an AP or by a UE.

* * * * *